United States Patent
Tomeba et al.

(10) Patent No.: US 11,297,631 B2
(45) Date of Patent: Apr. 5, 2022

(54) RADIO RECEIVING APPARATUS RADIO TRANSMISSION APPARATUS COMMUNICATION METHOD AND COMMUNICATION SYSTEM USING MULTI-USER TRANSMISSION

(71) Applicant: Sharp Kabushiki Kaisha, Osaka (JP)

(72) Inventors: Hiromichi Tomeba, Sakai (JP); Tomoki Yoshimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/548,247

(22) PCT Filed: Jan. 29, 2016

(86) PCT No.: PCT/JP2016/052795
§ 371 (c)(1),
(2) Date: Aug. 2, 2017

(87) PCT Pub. No.: WO2016/125715
PCT Pub. Date: Aug. 11, 2016

(65) Prior Publication Data
US 2018/0020461 A1    Jan. 18, 2018

(30) Foreign Application Priority Data
Feb. 3, 2015   (JP) .............................. JP2015-018911

(51) Int. Cl.
*H04W 72/04* (2009.01)
*H04W 72/12* (2009.01)
(Continued)

(52) U.S. Cl.
CPC ......... *H04W 72/121* (2013.01); *H04L 5/0053* (2013.01); *H04W 28/0215* (2013.01);
(Continued)

(58) Field of Classification Search
CPC .......... H04W 72/042; H04W 72/0446; H04W 72/0413; H04W 88/02; H04W 28/26; H04W 72/04; H04L 5/0053
(Continued)

(56) References Cited

U.S. PATENT DOCUMENTS 8,259,745 B2   9/2012 Gong et al.
8,451,771 B2   5/2013 Hedayat et al.
(Continued)

FOREIGN PATENT DOCUMENTS

JP   2011-188106 A   9/2011
JP   2014-017628 A   1/2014

OTHER PUBLICATIONS

Koichi Ishihara et al. "Simultaneous transmission technologies for HEW" IEEE 11-13/1395r2, Nov. 2013.
(Continued)

*Primary Examiner* — Jeffrey M Rutkowski
*Assistant Examiner* — Luna Weissberger
(74) *Attorney, Agent, or Firm* — ScienBiziP, P.C.

(57) ABSTRACT

OFDMA transmission by a plurality of terminal apparatuses is realized in a communication system in which CSMA/CA is premised and existing terminal apparatuses coexist. A communication method of a radio receiving apparatus of the invention includes the steps of: receiving a resource reserving signal which is transmitted from the radio transmission apparatus and which includes information indicating that the signal is addressed to the plurality of radio receiving apparatuses; and transmitting a resource reserving response signal to the radio transmission apparatus by using at least one radio resource with which the resource reserving signal is received, in which at least part of information included in the resource reserving response signal is identical to information
(Continued)

included in the first resource reserving response signal transmitted by another of the radio receiving apparatuses.

8 Claims, 12 Drawing Sheets

(51) Int. Cl.
    *H04W 74/08*     (2009.01)
    *H04L 5/00*     (2006.01)
    *H04W 28/02*     (2009.01)
    *H04W 84/12*     (2009.01)
    *H04W 28/06*     (2009.01)

(52) U.S. Cl.
    CPC ... *H04W 72/0446* (2013.01); *H04W 74/0816* (2013.01); *H04W 28/06* (2013.01); *H04W 84/12* (2013.01)

(58) Field of Classification Search
    USPC .......................................................... 370/336
    See application file for complete search history.

(56) References Cited

U.S. PATENT DOCUMENTS

| | | | |
|---|---|---|---|
| 8,971,351 B2 | 3/2015 | Gong et al. | |
| 9,326,158 B2 | 4/2016 | Abraham et al. | |
| 9,503,339 B2 | 11/2016 | Gong et al. | |
| 9,554,400 B2 | 1/2017 | Morioka et al. | |
| 10,038,612 B2 | 7/2018 | Gong et al. | |
| 2007/0081485 A1 | 4/2007 | Li | |
| 2011/0235576 A1 | 9/2011 | Gong et al. | |
| 2011/0261708 A1* | 10/2011 | Grandhi | H04L 5/0048 370/252 |
| 2012/0147804 A1 | 6/2012 | Hedayat et al. | |
| 2012/0207036 A1* | 8/2012 | Ong | H04W 72/04 370/252 |
| 2012/0294163 A1* | 11/2012 | Turtinen | H04W 72/042 370/252 |
| 2012/0300707 A1 | 11/2012 | Gong et al. | |
| 2012/0307696 A1* | 12/2012 | Morioka | H04W 72/0446 370/310 |
| 2013/0208607 A1 | 8/2013 | Abraham et al. | |
| 2015/0023274 A1* | 1/2015 | Morita | H04W 72/0406 370/329 |
| 2015/0180751 A1 | 6/2015 | Gong et al. | |
| 2016/0113036 A1* | 4/2016 | Stephens | H04W 76/10 370/312 |
| 2016/0183243 A1* | 6/2016 | Park | H04L 27/04 370/329 |
| 2016/0197700 A1 | 7/2016 | Abraham et al. | |
| 2017/0105232 A1 | 4/2017 | Morioka et al. | |
| 2017/0324630 A1 | 11/2017 | Gong et al. | |
| 2018/0213516 A1* | 7/2018 | Kim | H04W 88/08 |

OTHER PUBLICATIONS

Po-Kai Huang et al (Intel), MU-RTS/CTS for DL MU, IEEE 802.11-15/0867r0, Jul. 13, 2015, p. 12, 13.

* cited by examiner

RADIO RECEIVING APPARATUS RADIO TRANSMISSION APPARATUS COMMUNICATION METHOD AND COMMUNICATION SYSTEM USING MULTI-USER TRANSMISSION

TECHNICAL FIELD

The present invention relates to a radio receiving apparatus, a radio transmission apparatus, a communication method, and a communication system.

BACKGROUND ART

An IEEE802.11ac standard has been developed by the IEEE (The Institute of Electrical and Electronics Engineers, Inc.) as an advanced standard of IEEE802.11n which is a radio LAN (Local area network) standard that has been widely put into use. Currently, standardization for IEEE802.11ax is intended as a successive standard of IEEE802.11n/ac. In the current radio LAN system, interference due to an increase in the number of terminals per unit area is becoming a large problem, and such an overcrowded environment needs to be taken into consideration in the IEEE802.11ax standard. On the other hand, differently from the past radio LAN standards, not only improvement of peak throughput but also improvement of user throughput are discussed as main requirements in the IEEE802.11ax standard. It is essential to introduce a highly efficient simultaneous multiplexing transmission scheme (access scheme) in order to improve the user throughput.

In standards before the IEEE802.11n standard, an autonomous distributed control access scheme called CSMA/CA (Carrier sense multiple access with collision avoidance) has been adopted as the access scheme. Space division multiple access (SDMA) by a multi-user multiple-input multiple-output (MU-MIMO) technique is newly added in IEEE802.11ac.

Further improvement of the access scheme is required in the IEEE802.11ax standard for improving the user throughput. Examples of the highly efficient access scheme include Orthogonal Frequency Division Multiple Access (OFDMA). The OFDMA is a scheme using characteristics of Orthogonal Frequency Division Multiplexing (OFDM) in which frequency efficiency is enhanced by arranging a large number of orthogonal sub-carriers densely at intervals of a reciprocal of a signal duration. In the OFDMA, any number of sub-carriers (or a frequency band composed of a group of contiguous sub-carriers) with good characteristics are allocated to each of radio receiving apparatuses in accordance with reception characteristics different between the radio receiving apparatuses in multipath environments, thereby further increasing substantial frequency efficiency. It is expected that the user throughput is improved by introducing the OFDMA to the IEEE802.11ax standard (NPL 1).

CITATION LIST

Non Patent Literature

NPL 1: IEEE 11-13/1395r2, "Simultaneous transmission technologies for HEW", November 2013.

SUMMARY OF INVENTION

Technical Problem

However, the IEEE802.11ax standard needs to coexist with an existing IEEE802.11 standard such as IEEE802.11n/ac. Thus, in the case where the OFDMA is introduced to the IEEE802.11ax standard and virtual carrier sense is used, the carrier sense needs to be recognized also by the existing IEEE802.11 standard. In the case where virtual carrier sense of the existing IEEE802.11 standard is simply introduced to the IEEE802.11ax standard, however, overhead increases and improvement of throughput is limited.

The invention has been made in view of such circumstances, and an object thereof is to provide a radio transmission apparatus, a radio receiving apparatus, a radio communication system, and a communication method that are allowed to coexist with a communication apparatus of the existing communication system, in a communication system which has CSMA/CA as a premise and to which is introduced a new access scheme that is not introduced to an existing communication system to coexist.

Solution to Problem

A radio transmission apparatus, a radio receiving apparatus, a communication system, and a communication method according to the invention for solving the aforementioned problems are as follows.

(1) That is, a radio receiving apparatus of the invention is a radio receiving apparatus performing communication with a radio transmission apparatus that performs multi-user transmission with a plurality of radio receiving apparatuses in a communication system that controls transmission opportunity in an autonomous distributed manner, and the radio receiving apparatus includes: a reception unit that receives a resource reserving signal which is transmitted from the radio transmission apparatus; and a transmission unit that transmits a first resource reserving response signal and a second resource reserving response signal to the radio transmission apparatus by using at least one radio resource with which the resource reserving signal is received, in which at least information included in the first resource reserving response signal is identical to information included in the first resource reserving response signal transmitted by another of the radio receiving apparatuses.

(2) The radio receiving apparatus of the invention is the radio receiving apparatus according to (1) above, in which a radio resource with which the transmission unit transmits the second resource reserving response signal is part of a radio resource with which the transmission unit transmits the first resource reserving response signal and information indicating the radio resource with which the transmission unit transmits the second resource reserving response signal is signaled from the radio transmission apparatus.

(3) The radio receiving apparatus of the invention is the radio receiving apparatus according to (1) above, in which the transmission unit applies cyclic shift to the second resource reserving response signal and information indicating a cyclic shift amount of the cyclic shift applied by the transmission unit to the second resource reserving response signal is signaled from the radio transmission apparatus.

(4) The radio receiving apparatus of the invention is the radio receiving apparatus according to any of (1) to (3) above, in which the second resource reserving response signal includes information indicating the radio resource with which the transmission unit transmits the first resource reserving response signal.

(5) The radio receiving apparatus of the invention is the radio receiving apparatus according to any of (1) to (3) above, in which the resource reserving signal includes information indicating that the radio transmission apparatus starts the multi-user transmission.

(6) The radio receiving apparatus of the invention is the radio receiving apparatus according to any of (1) to (3) above, in which the reception unit starts a reception operation after the transmission unit has transmitted the second resource reserving signal, and stops the reception operation in a case of having not received a signal transmitted from the radio transmission apparatus for a certain time period after the reception operation has started.

(7) A radio transmission apparatus of the invention is a radio transmission apparatus that performs multi-user transmission with a plurality of radio receiving apparatuses in a communication system that controls transmission opportunity in an autonomous distributed manner, and the radio transmission apparatus includes: a transmission unit that transmits a resource reserving signal to the plurality of radio receiving apparatuses; and a reception unit that receives first resource reserving response signals and second resource reserving response signals transmitted from the plurality of radio receiving apparatuses, in which information indicating a radio resource with which the plurality of radio receiving apparatuses transmit the first resource reserving response signals is acquired on the basis of the second resource reserving response signals.

(8) The radio transmission apparatus of the invention is the radio transmission apparatus according to (7) above, in which a radio resource with which the plurality of radio receiving apparatuses transmit the second resource reserving response signals is signaled to the plurality of radio receiving apparatuses.

(9) The radio transmission apparatus of the invention is the radio transmission apparatus according to (7) above, in which a shift amount of cyclic shift applied by the plurality of radio receiving apparatuses to the second resource reserving response signals is signaled to the plurality of radio receiving apparatuses.

(10) The radio transmission apparatus of the invention is the radio transmission apparatus according to any of (7) to (9) above, in which information indicating that the multi-user transmission is started is included in the resource reserving signal.

(11) The radio transmission apparatus of the invention is the radio transmission apparatus according to (10) above, in which the information indicating that the multi-user transmission is started is information indicating a group of the plurality of radio receiving apparatuses that participate in the multi-user transmission.

(12) A communication method of the invention is a communication method included in a radio receiving apparatus performing communication with a radio transmission apparatus that performs multi-user transmission with a plurality of radio receiving apparatuses in a communication system that controls transmission opportunity in an autonomous distributed manner, and the communication method includes the steps of: receiving a resource reserving signal which is transmitted from the radio transmission apparatus; and transmitting a first resource reserving response signal and a second resource reserving response signal to the radio transmission apparatus by using at least one radio resource with which the resource reserving signal is received, in which information included in the first resource reserving response signal is identical to information included in the first resource reserving response signal transmitted by another of the radio receiving apparatuses.

(13) A communication method of the invention is a communication method included in a radio transmission apparatus performing multi-user transmission with a plurality of radio receiving apparatuses in a communication system that controls transmission opportunity in an autonomous distributed manner, and the communication method includes the steps of: transmitting a resource reserving signal to the plurality of radio receiving apparatuses; receiving first resource reserving response signals and second resource reserving response signals transmitted from the plurality of radio receiving apparatuses; and acquiring, on the basis of the second resource reserving response signals, information indicating a radio resource with which the plurality of radio receiving apparatuses transmit the first resource reserving response signals.

(14) A communication system of the invention is a communication system that controls transmission opportunity in an autonomous distributed manner and includes a plurality of radio receiving apparatuses and a radio transmission apparatus that performs multi-user transmission with the plurality of radio receiving apparatuses, in which the radio receiving apparatus includes: a reception unit that receives a resource reserving signal which is transmitted from the radio transmission apparatus; and a transmission unit that transmits a first resource reserving response signal and a second resource reserving response signal to the radio transmission apparatus by using at least one radio resource with which the resource reserving signal is received, in which information included in the first resource reserving response signal is identical to information included in the first resource reserving response signal transmitted by another of the radio receiving apparatuses, the radio transmission apparatus includes: a transmission unit that transmits the resource reserving signal to the plurality of radio receiving apparatuses; and a reception unit that receives the first resource reserving response signals and the second resource reserving response signals transmitted from the plurality of radio receiving apparatuses, in which information indicating a radio resource with which the plurality of radio receiving apparatuses transmit the first resource reserving response signals is acquired on the basis of the second resource reserving response signals.

Advantageous Effects of Invention

According to the invention, it is possible to introduce a new access scheme to a new communication system while allowing coexistence with a communication apparatus of an existing communication system, thus making it possible to greatly improve user throughput.

DESCRIPTION OF EMBODIMENTS

1. First Embodiment

Figure 1:
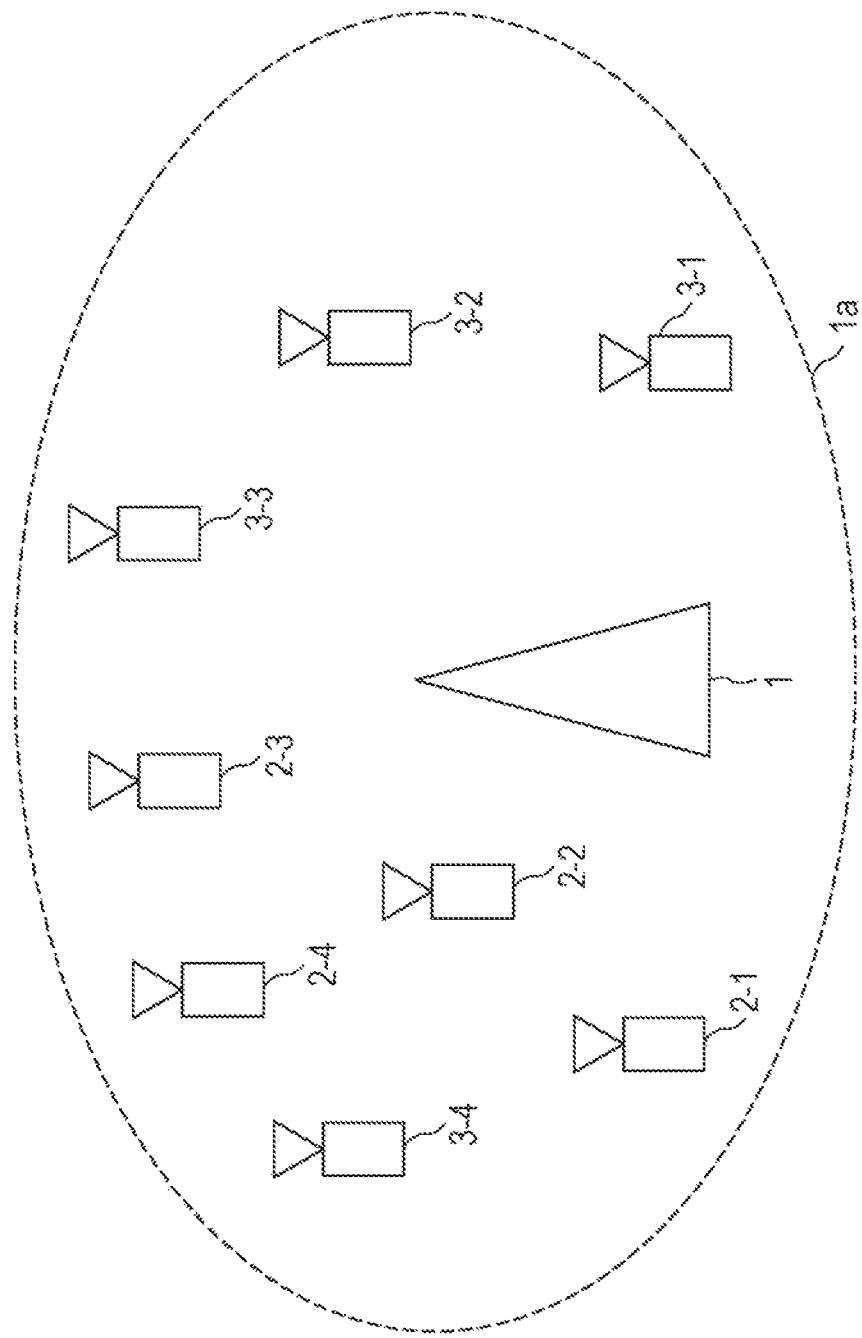
FIG. 1 illustrates an example of a communication system according to the invention.

A communication system in the present embodiment includes a radio transmission apparatus (access point (AP)) and a plurality of radio receiving apparatuses (stations (STAs)). A network composed of the AP and the STAs is called a basic service set (BSS).

The AP and the STAs in the BSS perform communication on the basis of CSMA/CA (Carrier sense multiple access with collision avoidance). Though the present embodiment is intended for an infrastructure mode in which the AP performs communication with a plurality of STAs, a method of the present embodiment may be carried out also in an ad hoc mode in which STAs directly perform communication with each other.

In an IEEE802.11 system, apparatuses are able to transmit transmission frames of a plurality of frame types having a common frame format. The transmission frames are defined by a physical (PHY) layer, a medium access control (MAC) layer, and a logical link control (LLC) layer.

The transmission frame of the PHY layer is called a physical protocol data unit (PHY protocol data unit: PPDU). The PPDU is constituted by a physical layer header (PHY header) including, for example, header information for performing signal processing in the physical layer, a physical service data unit (PHY service data unit: PSDU) that is a data unit processed in the physical layer, and the like. The PSDU is able to be constituted by an aggregated MPDU (A-MPDU) in which a plurality of MAC protocol data units (MPDUs) each of which serves as a retransmission unit in a radio section are aggregated.

The PHY header includes reference signals of, for example, a short training field (STF) used for signal detection, synchronization, and the like and a long training field (LTF) used for acquiring channel information for data demodulation, and control signals such as signals (SIGs) in which control information for data demodulation is included. The STF is classified in accordance with a corresponding standard into a legacy-STF (L-STF), a high throughput-STF (HT-STF), a very high throughput-STF (VHT-STF), and the like, and the LTF or the SIG is also classified similarly into an L-LTF, an HT-LTF, a VHT-LTF, an L-SIG, an HT-SIG, and a VHT-SIG. The VHT-SIG is further classified into a VHT-SIG-A and a VHT-SIG-B.

The PPDU is modulated in accordance with a corresponding standard. For example, in the case of an IEEE802.11n standard, the PPDU is modulated to an orthogonal frequency division multiplexing (OFDM) signal.

The MPDU is constituted by a MAC layer header (MAC header) in which, for example, header information for performing signal processing in the MAC layer is included, a MAC service data unit (MSDU) or a frame body that is a data unit processed in the MAC layer, and a frame check sequence (FCS) for checking whether or not there is an error in a frame. A plurality of MSDUs are also able to be aggregated as an aggregated MSDU (A-MSDU).

The frame type of the transmission frame of the MAC layer is roughly classified into three data frames of a management frame in which, for example, a connection state between apparatuses is managed, a control frame in which a communication state between apparatuses is managed, and a data frame including actual transmission data, and each of the frames is further classified into a plurality of kinds of sub-frame types. The control frame includes a reception completion notification (Acknowledge: ACK) frame, a transmission request (Request to send: RTS) frame, a reception preparation completion (Clear to send: CTS) frame, and the like. The management frame includes a beacon frame, a probe request frame, a probe response frame, an authentication frame, a connection request (association request) frame, a connection response (association response) frame, and the like. The data frame includes a data frame, a polling (CF-poll) frame, and the like. Each apparatus is able to grasp a frame type and a sub-frame type of a received frame by reading content of a frame control field included in a MAC header.

The beacon frame includes an interval (Beacon interval) in which beacon is transmitted and a field in which information (Service set identifier (SSID) or the like) for identifying an AP is described. The AP is able to periodically broadcast a beacon frame into a BSS and an STA is able to grasp the AP around the STA by receiving the beacon frame. Grasping of the AP by the STA based on a signal that is broadcasted from the AP is referred to as passive scanning. On the other hand, probing of the AP by broadcasting a probe request frame into the BSS by the STA is referred to as active scanning. The AP is able to transmit a probe response frame as a response to the probe request frame and description content of the probe response frame is equivalent to that of the beacon frame.

The STA recognizes the AP and then performs connection processing for the AP. The connection processing is classified into an authentication procedure and a connection (association) procedure. The STA transmits an authentication frame to the AP that desires connection. Upon reception of the authentication frame, the AP transmits, to the STA, an authentication frame including a status code indicating, for example, whether or not to authenticate the STA. By reading the status code described in the authentication frame, the STA is able to determine whether or not authentication for the STA is allowed by the AP. Note that, the AP and the STA are able to exchange an authentication frame a plurality of times.

Subsequently to the authentication procedure, the STA transmits a connection request frame to the AP to perform the connection procedure. Upon reception of the connection request frame, the AP determines whether or not to allow connection of the STA and transmits a connection response frame to notify whether or not to allow the connection. In addition to the status code indicating whether or not connection processing is allowed, an association identification number (Association identifier: AID) for identifying the STA is described in the connection response frame. The AP is able to manage a plurality of STAs by setting different AIDs to the STAs that have been allowed to make connection.

After the connection processing is performed, the AP and the STA perform actual data transmission. In the IEEE802.11 system, a distributed coordination function (DCF), a point coordination function (PCF), and an extended function thereof (such as a hybrid coordination function: HCF) are defined. Description will be given below by taking a case where the AP transmits a signal to the STA by the DCF as an example.

In the DCF, prior to communication, the AP and the STA perform carrier sense (CS) for checking a usage state of a radio channel around the AP and the STA. For example, in a case where the AP serving as a transmission station receives, by the radio channel, a signal having a level higher than a clear channel assessment level (CCA level) that is defined in advance, the AP postpones transmission of a transmission frame by the radio channel to start a reception operation. Hereinafter, in the radio channel, a state in which a signal having a level equal to or greater than the CCA level is detected is referred to as a busy state and a state in which a signal having a level equal to or greater than the CCA level is not detected is referred to as an idle state. The CS performed by each apparatus on the basis of power of an actually received signal in this manner is called physical carrier sense (physical CS). Note that, the CCA level is also referred to as a carrier sense level (CS level) or a CCA threshold (CCAT). Note that, when detecting a signal having a level equal to or greater than the CCA level, the AP and the STA start an operation of demodulating at least a signal of the PHY layer.

The AP performs carrier sense during a frame interval (Inter frame space: IFS) according to a type of the transmission frame to be transmitted and determines whether the radio channel is in the busy state or the idle state. A time period in which the AP performs the carrier sense varies in accordance with a frame type and a sub-frame type of the transmission frame to be transmitted by the AP. In the IEEE802.11 system, a plurality of IFSs having different time periods are defined, and there are a short frame interval (Short IFS: SIFS) used for a transmission frame to which highest priority is given, a polling frame interval (PCF IFS: PIFS) used for a transmission frame having relatively high priority, a distributed control frame interval (DCF IFS: DIFS) used for a transmission frame having lowest priority, and the like. When the AP transmits a data frame by the DCF, the AP uses the DIFS.

The AP waits for the DIFS and then further waits for a random back-off time for preventing frame collision. The random back-off time called contention window (CW) is used in the IEEE802.11 system. In the CSMA/CA, it is premised that a transmission frame transmitted by a certain transmission station is received by a reception station in a state where there is no interference from other transmission stations. Therefore, when transmission frames are transmitted by transmission stations at the same timing, the frames collide with each other so that the reception station is not able to receive the transmission frames correctly. Thus, when each of the transmission stations waits for a time that is set randomly before starting the transmission, the frame collision is prevented. When determining that the radio channel is in the idle state by the carrier sense, the AP starts countdown of the CW, acquires a transmission right only when the CW indicates 0, and is allowed to transmit a data frame to the STA. Note that, in a case where the AP determines that the radio channel is in the busy state by the carrier sense during countdown of the CW, the AP stops countdown of the CW. In a case where the radio channel is brought into the idle state, the AP restarts countdown of the remaining CW subsequently to the previous IFS.

The STA serving as a reception station receives a transmission frame, reads a PHY header of the transmission frame, and demodulates the received transmission frame. By reading a MAC header of a demodulated signal, the STA is able to recognize whether or not the transmission frame is addressed to the STA. Note that, the STA is also able to determine an address of the transmission frame on the basis of information (for example, a group identification number (Group identifier: Group ID) described in the VHT-SIG-A) described in the PHY header.

When the STA determines that the received transmission frame is addressed to the STA and the transmission frame is demodulated without error, the STA needs to transmit, to the AP serving as the transmission station, an ACK frame indicating that the frame is able to be received correctly. The ACK frame is one of transmission frames that are transmitted only by waiting for the time period of the SIFS (without taking the random back-off time) and that have highest priority. Upon reception of the ACK frame transmitted from the STA, the AP ends a series of communication. Note that, when the STA is not able to receive the frame correctly, the STA does not transmit the ACK. Thus, when the AP has not received the ACK frame from the reception station for a fixed time period (length of SIFS+ACK frame) after the frame transmission, it is considered that communication has failed and the communication ends. In this manner, the end of one communication (also referred to as burst) of the IEEE802.11 system is always determined on the basis of whether or not the ACK frame is received except for special cases such as a case where a broadcast signal such as a beacon frame is transmitted and a case where fragmentation for fragment of transmission data is used.

When determining that the received transmission frame is not addressed to the STA, the STA sets a network allocation vector (NAV) on the basis of a length of the transmission frame described in the PHY header or the like. The STA does not attempt to perform communication during a time period that is set to the NAV. That is, since the STA performs, during the time period that is set to the NAV, the same operation as the operation performed when it is determined that the radio channel is in the busy state by the physical CS, communication control by the NAV is also called virtual carrier sense (virtual CS). The NAV is set not only on the basis of information described in the PHY header, but also by a transmission request (Request to send: RTS) frame or a reception preparation completion (Clear to send: CTS) frame that is introduced to solve a hidden node problem. The frame of the MAC layer of the RTS frame or the CTS frame includes a receiver address field indicating an address of the frame and a duration field indicating a time period of the NAV. A terminal apparatus that transmits the RTS frame or the CTS frame is able to describe, in the duration field, a time period during which a radio resource is to be occupied. The terminal apparatus that has received the RTS frame sets the NAV by a length described in the duration filed in a case where the RTS frame is not addressed to the terminal apparatus. On the other hand, in a case where the RTS frame is addressed to the terminal apparatus, when the SIFS has lapsed after the RTS frame has been received, the terminal apparatus that has transmitted the RTS frame uses a value of the duration field described in the RTS frame to estimate a time period during which the radio resource is occupied and transmits a CTS frame in which the value is written in the duration field.

While each apparatus performs carrier sense to autonomously acquire a transmission right in the DCF, a control station called a point coordinator (PC) controls a transmission right of each apparatus in the BSS in the PCF. The AP generally serves as the PC and acquires a transmission right of the STA in the BSS.

A communication period by the PCF includes a contention free period (CFP) and a contention period (CP). Communication is performed on the basis of the DCF described above during the CP and the PC controls the transmission right during the CFP. The AP serving as the PC broadcasts a beacon frame, in which a time period of the CFP (CFP Max duration) or the like is described, into the BSS prior to communication by the PCF. The PIFS is used to transmit the beacon frame that is broadcasted when transmission of the PCF starts and the beacon frame is transmitted without waiting for the CW. The STA having received the beacon frame sets the time period of the CFP described in the beacon frame to the NAV. After that, until the NAV has lapsed or a signal (for example, a data frame including CF-end) by which end of the CFP is broadcasted into the BSS is received, the STA is able to acquire the transmission right only when the STA receives a signal (for example, a data frame including CF-poll) that is transmitted by the PC and signals acquisition of the transmission right. Note that, since collision of packets in the same BSS does not occur during the time period of the CFP, each STA does not require the random back-off time used in the DCF.

The AP and the STA included in the communication system according to the present embodiment has the functions of performing a series of communication based on the CSMA/CA described above, but does not need to always have all the functions.

FIG. 1 is a schematic view illustrating an example of downlink of the communication system according to the first embodiment of the invention. In the communication system of FIG. 1, there is an AP 1 and a reference sign 1a denotes a range (coverage range, Basic service set (BSS)) that is able to be managed by the AP 1. In the BSS 1a, there are STAs 2-1 to 2-4 connected to the AP 1 and STAs 3-1 to 3-4 that are existing terminal apparatuses (conventional terminal apparatuses, legacy terminal apparatuses). Hereinafter, the STAs 2-1 to 2-4 are simply referred to also as STA 2s or first radio receiving apparatuses. Similarly, the STAs 3-1 to 3-4 are simply referred to also as STAs 3 or second radio receiving apparatuses. Compatible standards of the AP 1, the STAs 2, and the STAs 3 are different from each other. For example, the AP 1 and the STAs 2 are apparatuses to which the invention is able to be applied and the STAs 3 are apparatuses to which the invention is not applied. Note that, the STAs 3 do not need to be always connected to the AP 1 and may be connected to another AP. Another BSS (Overlapping BSS: OBSS) using at least a part of frequencies used by the BSS 1a may exist around the BSS 1a.

The AP 1, the STAs 2, and the STAs 3 perform communication on the basis of the CSMA/CA. Though the present embodiment is intended for an infrastructure mode in which each of the STAs 2 and the STAs 3 performs communication with the AP 1, a method of the present embodiment may be carried out also in an ad hoc mode in which STAs directly perform communication with each other.

Figure 2:
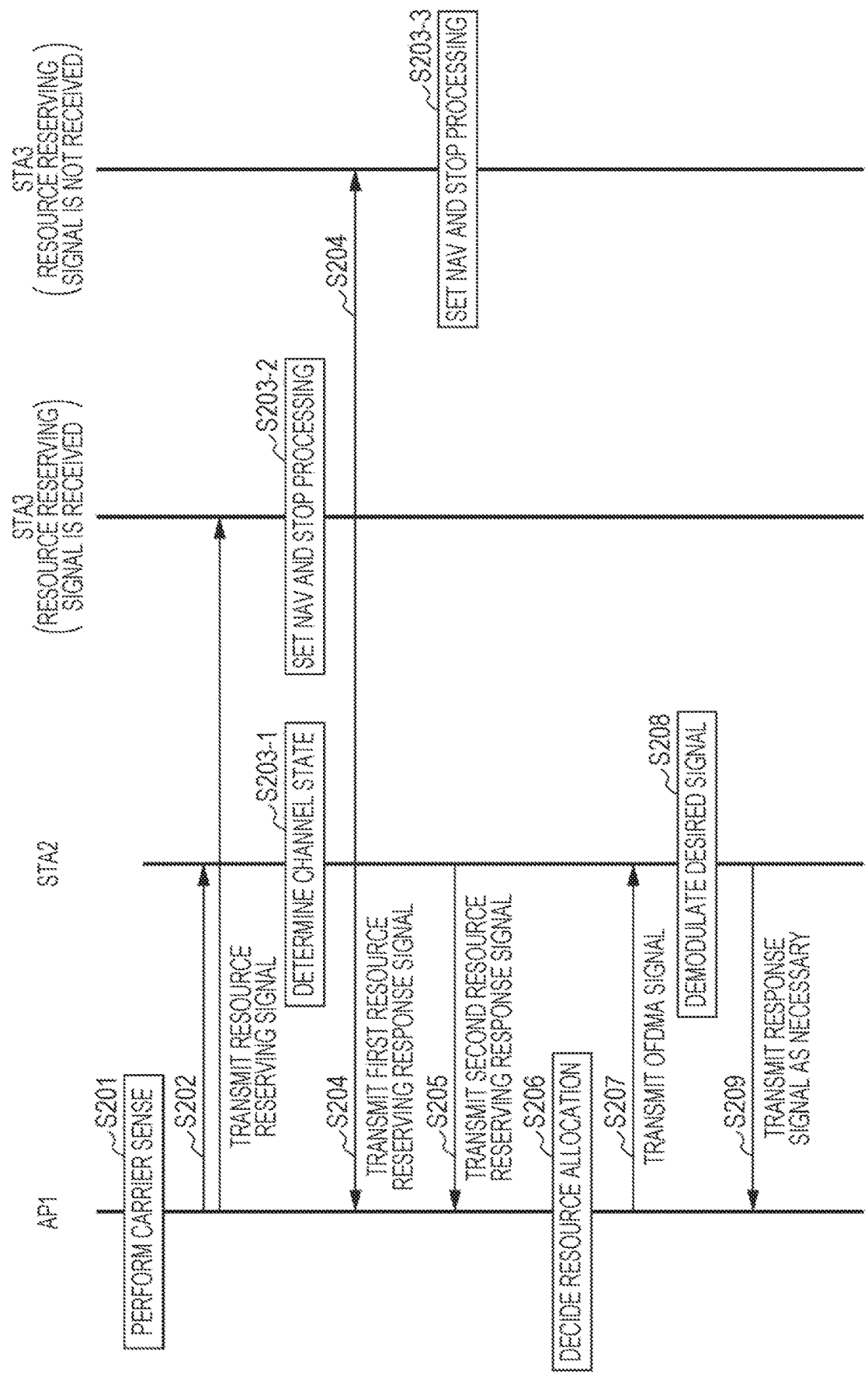
FIG. 2 is a sequence chart illustrating an example of communication of the invention.

FIG. 2 is a sequence chart illustrating a state of communication of the BSS 1a according to the present embodiment. In the present embodiment, the AP 1 performs multi-user transmission in which packets to the STAs 2-1 to 2-4 are transmitted simultaneously to the respective STAs 2. Description will be given below by assuming that the multi-user transmission is orthogonal frequency division multiple access (OFDMA). Note that, the AP 1 may realize the multi-user transmission by space division multiple access (SDMA) using a plurality of space resources.

In the BSS 1a, it is assumed that at least four frequency channels (ch) are able to be used and each of them has a band of 20 MHz. It is assumed that the AP 1 performs the OFDMA transmission by using the four channels. Note that, the AP 1 is also able to perform the OFDMA transmission by further dividing a channel of 20 MHz into a plurality of sub-channels and regarding the sub-channels as a plurality of frequency channels. Note that, the number of channels or sub-channels used for the AP 1 to perform the OFDMA transmission is not limited to four and any number of channels may be used. The frequency channels used for the AP 1 to perform the OFDMA transmission do not need to be always consecutive.

First, the AP 1 performs carrier sense for the four channels used for the OFDMA transmission and confirms that each of the channels is idle (step S201). Note that, the AP 1 may perform carrier sense for all the frequency channels that are able to be used and carry out the invention described below by using channels that are able to be determined to be idle as a result of the carrier sense. Description will be given below by assuming that the four channels are a 1 ch, a 2 ch, a 3 ch, and a 4 ch.

Next, the AP 1 transmits a resource reserving signal to signal, to a terminal apparatus around the AP 1, that the four channels are to be used, that is, the four channels are reserved for a fixed time period (step S202). Hereinafter, the AP 1 applies, as the resource reserving signal, an RTS frame prescribed by the IEEE802.11 standard.

Figure 3:
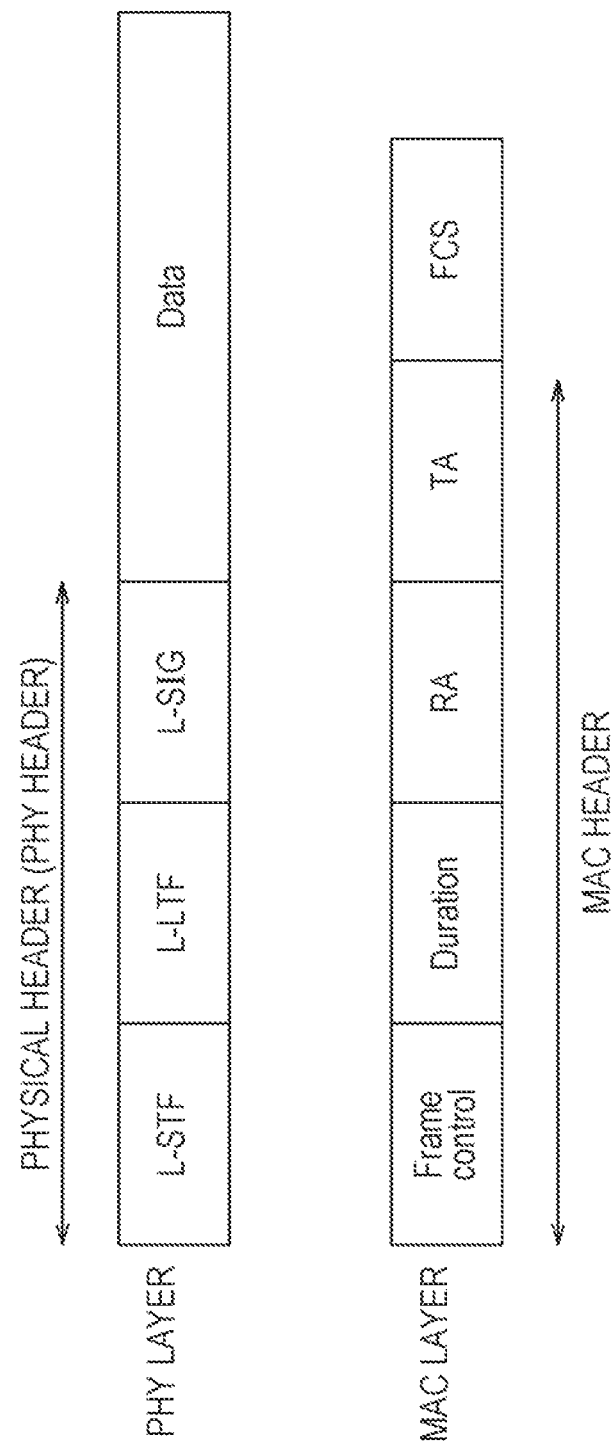
FIG. 3 illustrates a configuration example of a frame configuration of a signal of the invention.

FIG. 3 illustrates a frame configuration of an RTS frame according to the present embodiment. Both the PHY layer and the MAC layer have the same frame configuration as the frame configuration prescribed by the IEEE802.11 standard. In the MAC layer, the RTS frame includes frame control, duration, a receiver address (RA), a transmitter address (TA), and an FCS field. In a conventional RTS frame, the AP 1 describes, in the RA, address information (for example, MAC address) of a terminal apparatus as a transmission destination of the RTS frame. In the present embodiment, the AP 1 describes, in the RA, not address information of a terminal apparatus as a transmission destination but certain specific address information.

For example, the AP 1 is able to perform transmission by describing, in the RA field, information that is the same as a transmitter address, that is, address information (MAC address) of the AP 1. The RTS frame generated in this manner is transmitted by the AP 1, and when the STAs 3-1 to 3-4 in the BSS 1a receive the RTS frame, the STAs 3-1 to 3-4 recognize that the RTS frame is addressed to another apparatus and hence set the NAV. On the other hand, by grasping in advance that the RA and the TA are the same in an RTS frame transmitted before the OFDMA transmission by the AP 1, the STAs 2-1 to 2-4 are able to recognize that the RTS frame is an RTS frame addressed to the STAs 2-1 to 2-4. The AP 1 is also able to describe a specific address, such as a broadcast address, in the RA of the RTS frame.

The AP 1 is also able to describe information other than address information in the RA. For example, the AP 1 is able to describe, in the RA, information indicating a combination of STAs participating in the OFDMA transmission. As the information indicating a combination of STAs, for example, group identification number (Group identifier: group ID) information used in IEEE802.11ac is able to be described.

The AP and the STAs in the BSS are able to share in advance a table in which a plurality of combinations (STA groups) of STAs are described. The group ID is allocated to each of the STA groups described in the table. When a group ID is signaled by the AP, each of the STAs is able to grasp whether or not each of the STAs is included in the STA groups.

When the AP 1 according to the present embodiment describes a certain group ID in an RA of an RTS frame, the STAs 2-1 to 2-4 are able to recognize the RTS frame in which the group ID in which the STAs 2-1 to 2-4 are included is described in the RA as an RTS frame addressed to the STAs 2-1 to 2-4. On the other hand, the STAs 3-1 to 3-4 recognize the RTS frame as an RTS frame addressed to another apparatus and hence set the NAV. Note that, when a length of the group ID is shorter than a length (6 octets in the IEEE802.11 standard) of the RA field, the AP 1 is able to adjust a length of information described in the RA by adding appropriate information (for example, all 0) after the group ID. In this case, each of the STAs 2 is able to read information of the RA field by a length of information decided in advance between the STA 2 and the AP 1. Note that, when the AP 1 describes the group ID in the RA of the RTS frame, content of the RA may be matched with a MAC address of each of the STAs 3. In this case, the AP 1 is able to change information added after the group ID.

The AP 1 is also able to apply scrambling processing to the information described in the RA field. For example, the AP 1 and the STAs 2 are able to share a random code in advance. It may be configured such that the AP 1 multiplies (or takes an exclusive OR) the random code by information described in the RA field so that only the STAs 2 are able to read the information of the RA field.

As described above, it is considered that there are a plurality of methods of transmitting an RTS frame by the AP 1. Hereinafter, in a case where an RTS frame transmitted by the AP 1 is able to be recognized by the STAs 3-1 to 3-4 as an RTS frame addressed to another apparatus and is able to be recognized by at least one of the STAs 2-1 to 2-4 participating in OFDMA transmission as an RTS frame addressed to the at least one of the STAs 2-1 to 2-4, the RTS frame is called a first RTS frame (a first resource reserving signal or simply a resource reserving signal). Description will be given below by assuming that the AP 1 transmits the first RTS frame to the STAs 2-1 to 2-4.

The AP 1 is able to transmit the first RTS frame to channels used for the OFDMA transmission. For example, the AP 1 may transmit the RTS frame with a bandwidth of 20 MHz to each of the 1 ch to 4 ch. When the AP 1 performs the OFDMA transmission by using a sub-channel, the AP 1 may transmit the first RTS frame by a bandwidth of the sub-channel or transmit the first RTS frame to a channel to which the sub-channel belongs.

The STAs 3-1 to 3-4 set the NAV to an address of the reception station as described above to receive an RTS frame in which address information of the STAs 3-1 to 3-4 is not described.

On the other hand, the STAs 2-1 to 2-4 participating in the OFDMA transmission recognize the first RTS frame transmitted by the AP 1 as an RTS frame addressed to the STAs 2-1 to 2-4, and hence determine whether the channels of the 1 ch to 4 ch on which the RTS frame has been received are idle or busy. Basically, at a time when the first RTS frame has been received, the STAs 2 are able to determine that the channels on which the first RTS frame has been received are idle, but do not need to always determine that the channels are idle and may determine that the channels are busy in accordance with reception quality or the like.

Note that, each of the STAs 2 do not need to always perform a reception operation for all the channels on which the AP 1 has transmitted the first RTS frame. In accordance with performance of the STA 2, a state of the past traffic amount of the BSS 1*a*, power consumption of the STA 2, or the like, the STA 2 may change a channel for performing a reception operation. The STA 2 may not determine whether all the channels on which the RTS frame has been received are idle. For example, when the STA 2-1 performs the reception operation for the 1 ch and the 2 ch and receives the first RTS frame on both the channels, the STA 2-1 may determine states of both the channels, or may determine only a state of one of the channels and determine that the other channel is always busy.

The AP 1 is also able to transmit the first RTS frame by including information indicating a channel on which the AP 1 transmits the first RTS frame. For example, when describing a group ID in an RA filed of the first RTS frame, the AP 1 is able to describe information, which indicates a channel on which the first RTS frame is transmitted, after the group ID. In this case, the STA 2 is able to perform the reception operation only for one channel and grasp, from the received first RTS frame, a channel on which the AP 1 has transmitted the first RTS frame other than the channel on which the first RTS frame received by the STA 2 has been transmitted. Thus, the STA 2 is able to grasp all the channels on which the AP 1 has transmitted the first RTS frame, and hence is able to determine whether each of the channels is idle or busy.

The AP 1 is also able to describe, in the first RTS frame, information indicating that the AP 1 starts the OFDMA transmission. For example, when describing a group ID in the RA field of the first RTS frame, the AP 1 is able to describe information (for example, flag bit), which indicates that the OFDMA transmission is started, after the group ID.

Hereinafter, it is assumed that the STA 2 performs a reception operation for all the channels on which the AP 1 has transmitted the first RTS frame, and the STA 2 determines states (idle or busy) of all the channels in accordance with interference power or the like.

Figure 4:
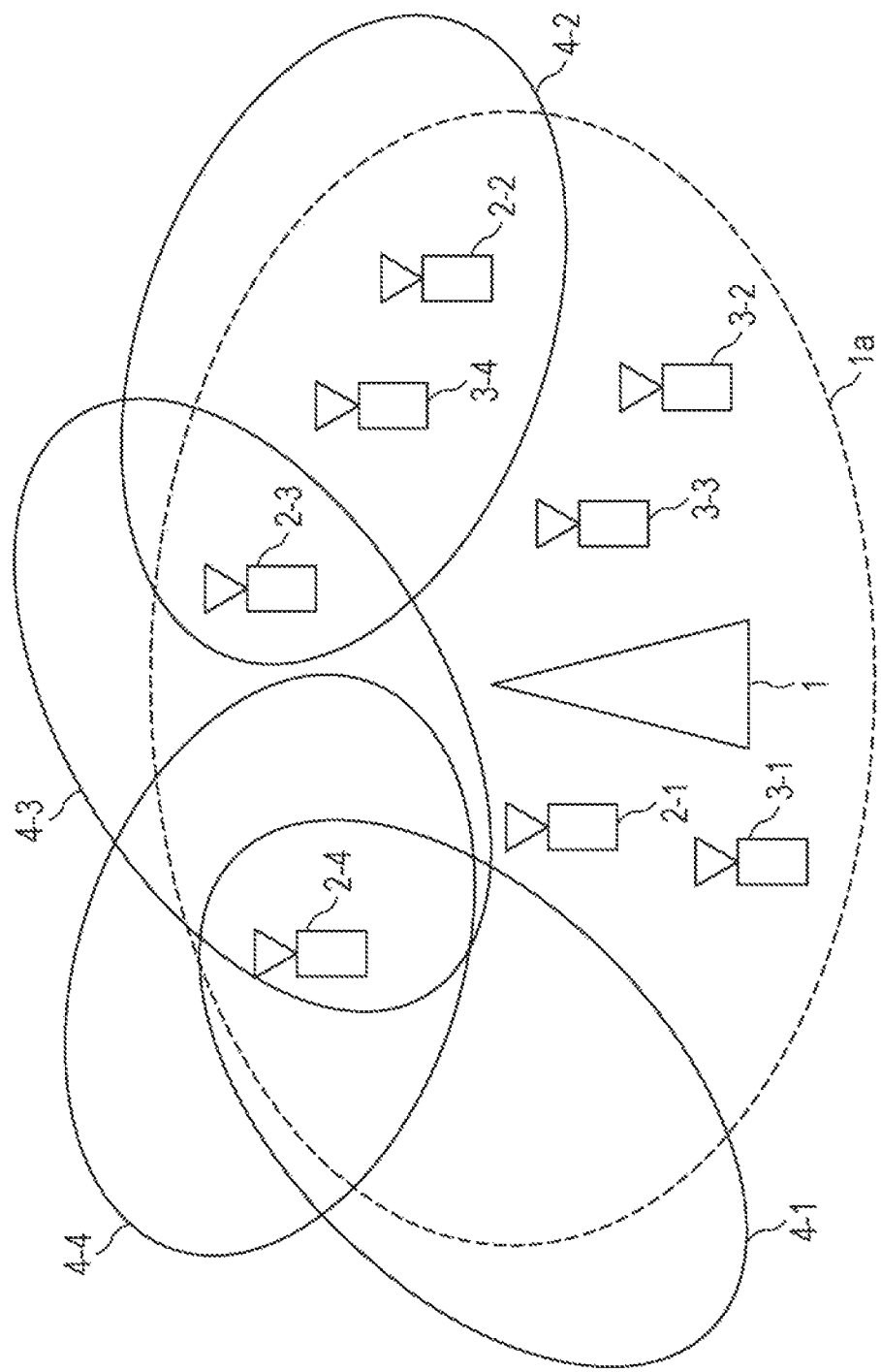
FIG. 4 illustrates an example of a state of interference of the communication system according to the invention.

FIG. 4 illustrates a state of channels of the communication system according to the present embodiment. The following description will be given by assuming that the channel state illustrated in FIG. 4 is provided. In FIG. 4, the AP 1, the STAs 2, the STAs 3, and the BSS 1*a* are similar to those of FIG. 1, interference ranges 4-1 to 4-4 indicate states of interference from a different BSS (Overlapping BSS: OBSS), and an interference range 4-N indicates a range in which an interference signal reaches in a channel N (N ch). That is, the STA 2-1 does not observe any interference from the OBSS. The STA 2-2 observes interference from the OBSS on the 2 ch. The STA 2-3 observes interference from the OBSS on the 2 ch and the 3 ch. The STA 2-4 observes interference from the OBSS on the 1 ch, the 3 ch, and the 4 ch.

With reference back to FIG. 2, each of the STAs 3 having received the first RTS frame sets the NAV on the basis of description in a duration field of the first RTS frame (step S203-2). On the other hand, each of the STAs 2 receives the first RTS frame and determines whether the channel on which the first RTS frame has been received is idle or busy (step S203-1). When determining that a state of the channel is idle, the STA 2 transmits a resource reserving response signal to the channel that is determined to be idle. In the present embodiment, the STA 2 is able to apply, as the resource reserving response signal, a CTS frame prescribed in the IEEE802.11 standard.

Figure 5:
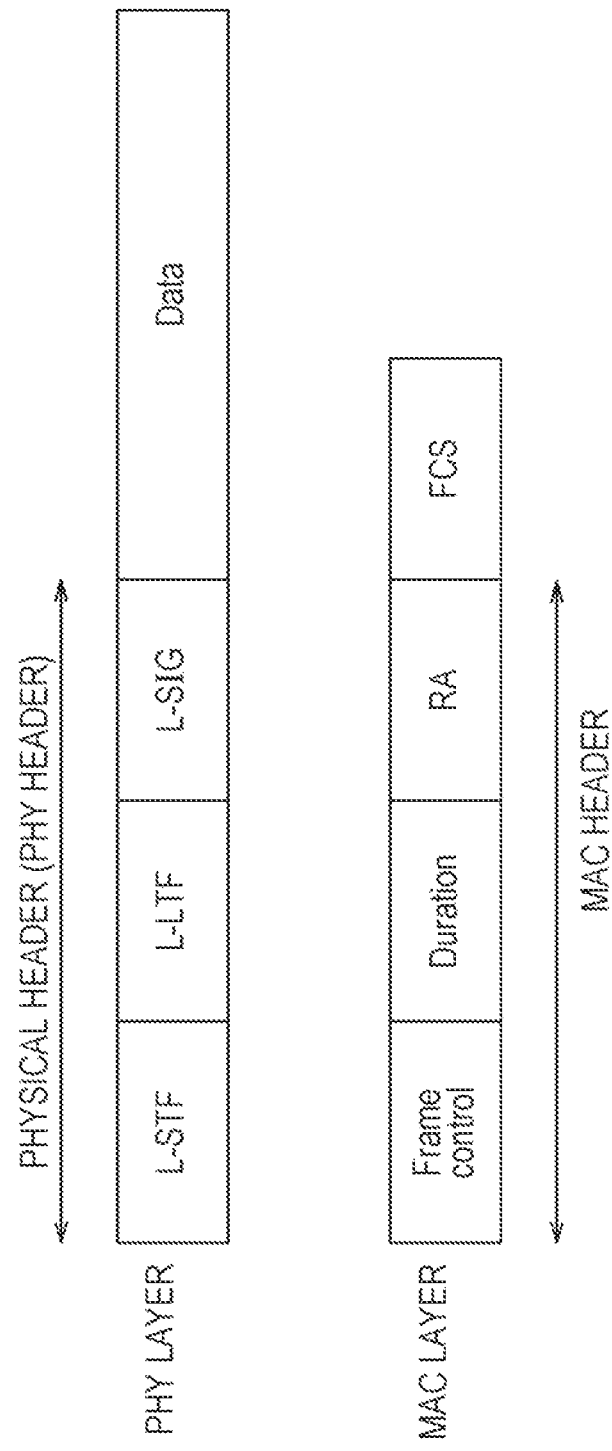
FIG. 5 illustrates a configuration example of a frame configuration of a signal of the invention.

FIG. 5 illustrates a frame configuration of a CTS frame according to the present embodiment. The frame configuration is identical to a frame configuration prescribed in the IEEE802.11 standard and includes frame control, duration, an RA, and an FCS field. In a conventional CTS frame, the STA 2 copies content of a TA of a corresponding RTS frame and describes the resultant in an RA. In the CTS frame according to the present embodiment, similarly to the conventional CTS frame, content of the TA of the corresponding RTS frame may be copied to describe the resultant in the RA or a value decided between the STA 2 and the AP 1 in advance may be described. Hereinafter, a CTS frame transmitted by each of the STAs 2-1 to 2-4 is referred to as a first CTS frame (a first resource reserving response signal, a CTS 1) in the present embodiment.

All the STAs 2-1 to 2-4 according to the present embodiment transmit the same first CTS frames to the AP 1. The same herein means that the AP 1 is able to recognize that the first CT frames are the same. Thus, in a case where the AP 1 receives two CTS frames, even if the two CTS frames have partially different signal waveforms, the two CTS frames are the same when the AP 1 is able to recognize that the two CTS frames are the same frames. That is, it may be said that the two CTS frames include at least partially common information.

Each of the STAs 2 transmits the first CTS frame in accordance with the states of the channels (step S204). For example, in the case of the state of FIG. 4, the STA 2-1 transmits the first CTS frame to all the channels of the 1 ch to 4 ch. The STA 2-2 transmits the first CTS frame to the 1 ch, the 3 ch, and the 4 ch. The STA 2-3 transmits the first CTS frame to the 1 ch and the 4 ch. The STA 2-4 transmits the first CTS frame to the 2 ch. Note that, each of the STAs 2 waits for a predetermined time period (for example, SIFS) after reception of the first RTS frame ends and then transmits the first CTS frame. Thus, the STAs 2-1 to 2-4 simultaneously transmit the first CTS frames.

When each of the STAs 3 that is not able to observe the resource reserving signal transmitted by the AP 1 but is able to observe the first CTS frame receives the first CTS frame, the STA 3 is able to recognize that the first CTS frame is not addressed to the STA 3, so that the STA 3 is able to set the NAV (step S203-3). Thus, when the AP 1 and each of the STAs 2 exchange the first RTS frame and the first CTS frame, the AP 1 is able to reserve a channel used for the OFDMA transmission.

Figure 6:
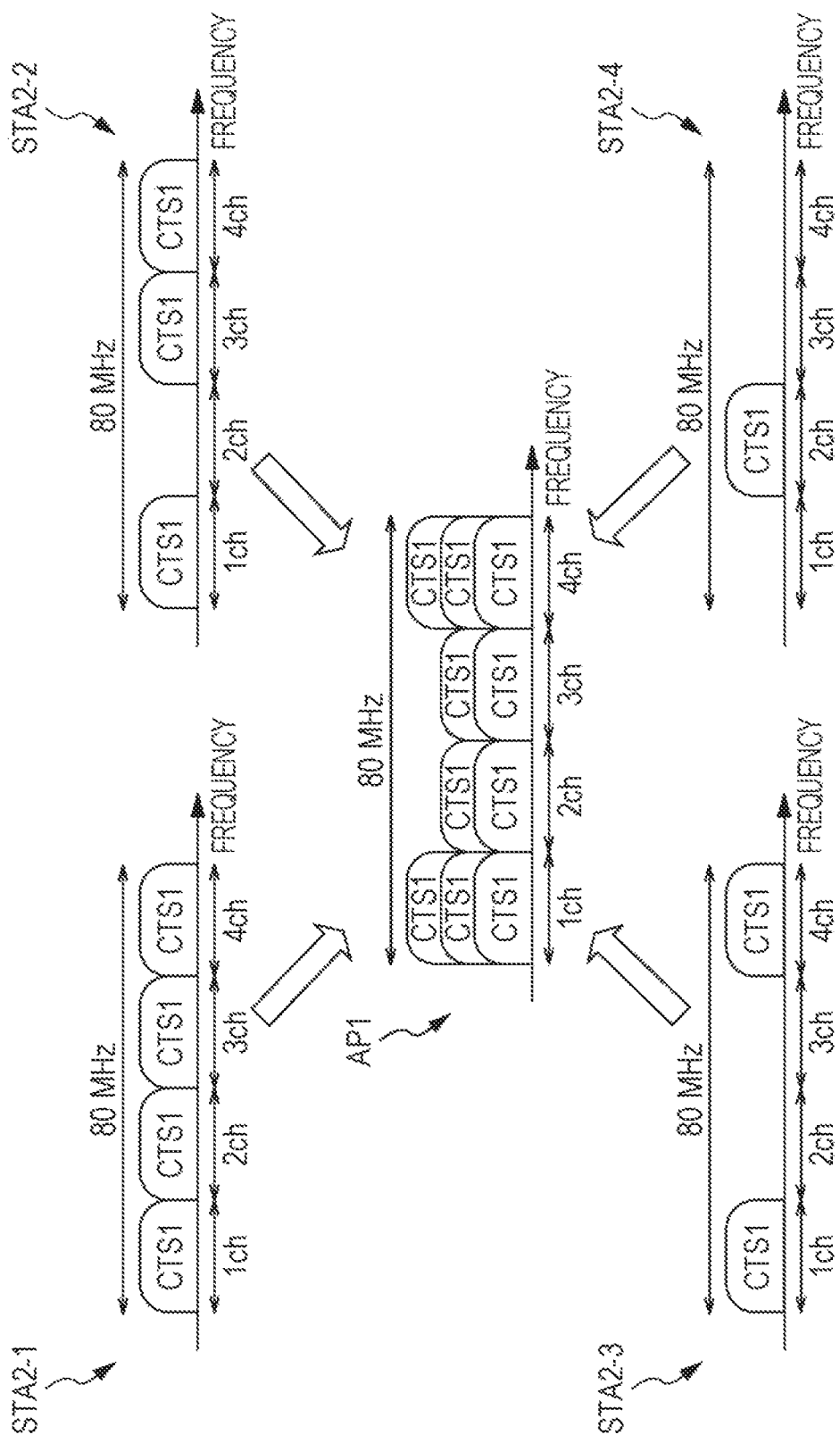
FIG. 6 illustrates an example of a state of communication of the invention.

FIG. 6 is a schematic view illustrating an example of a state of transmission of the first CTS frames by the STAs 2 and a state of reception of the first CTS frames by the AP 1 according to the present embodiment. The STA 2 according to the present embodiment transmits the first CTS frame simultaneously with other STAs 2. Thus, the first CTS frames transmitted by the STAs 2 are received by the AP 1 in a combined state. Thus, the AP 1 is able to determine that a channel on which the first CTS frames have been received is able to be reserved at least in a part of the BSS 1*a*. Accordingly, the AP 1 according to the present embodiment is able to perform the OFDMA transmission using the channel.

However, even when the AP 1 has received the first CTS frames, the channel is not always reserved in a whole of the BSS 1*a*, so that transmission quality is deteriorated when the AP 1 performs the OFDMA transmission by using the channel. In order for the AP 1 to realize highly efficient OFDMA transmission, the AP 1 needs to accurately recognize to which channel each of the STAs 2 has transmitted the first CTS frame. Thus, the STA 2 according to the present embodiment waits for a fixed time period (for example, SIFS) after transmitting the first CTS frame and then transmits a second resource reserving response signal (a second CTS frame, a CTS 2) indicating which channel is used by the STA 2 to transmit the first CTS frame (step S205).

In order for each of the STAs 2 to transmit the second CTS frame correctly, the 1 ch to 4 ch having a bandwidth of 20 MHz are able to be further divided into a plurality of sub-channels in the communication system according to the present embodiment. The AP 1 is able to allocate the sub-channels in advance to the STAs 2-1 to 2-4. By transmitting the second CTS frame on the sub-channel allocated to each of the STAs 2 in the channel on which the STA 2 has transmitted the first CTS frame, the STA 2 is able to signal, to the AP 1, that the STA 2 has transmitted the first CTS frame on the channel.

Figure 7:
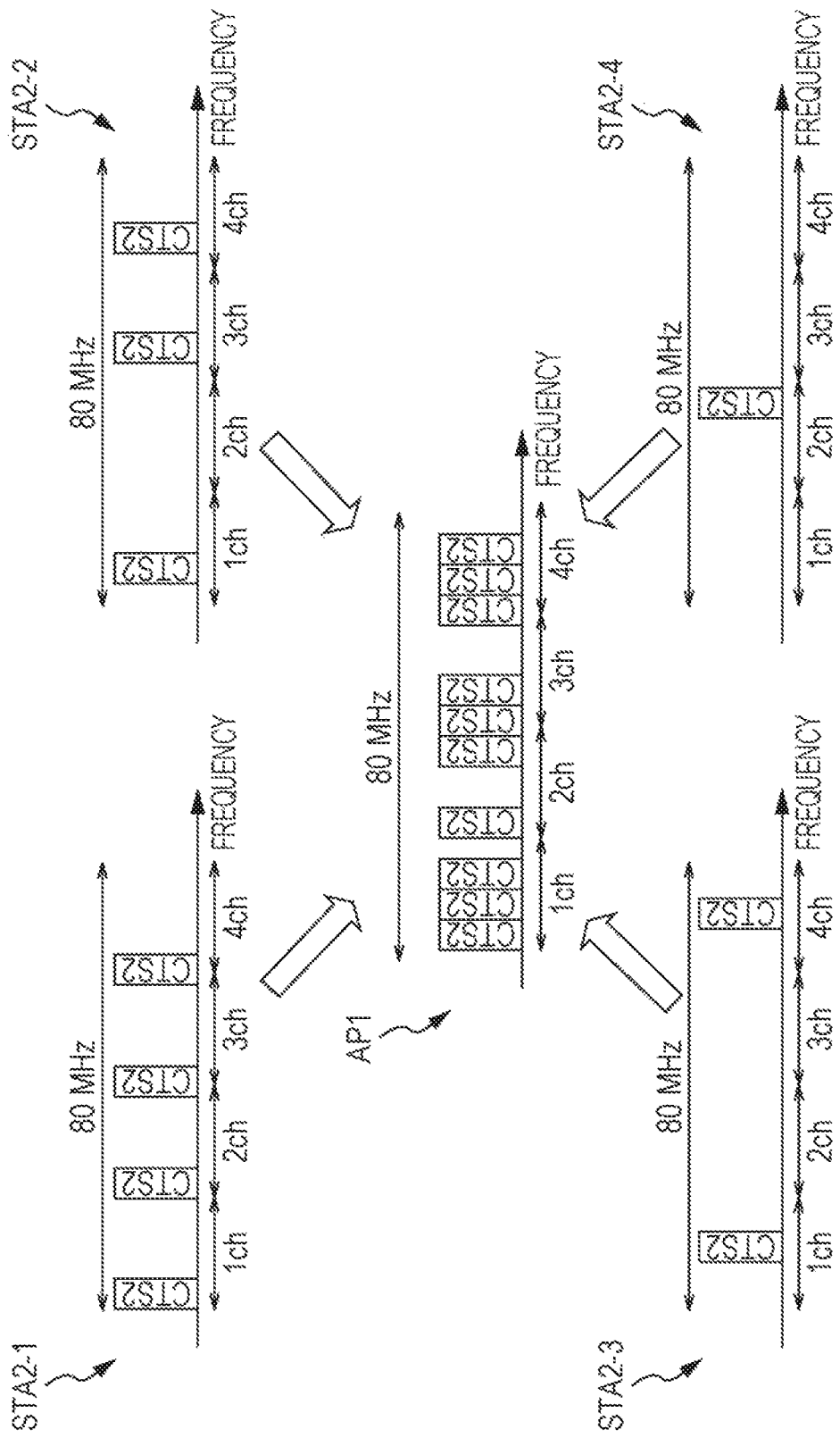
FIG. 7 illustrates an example of a state of communication of the invention.

FIG. 7 is a schematic view illustrating an example of a state of transmission of the second CTS frames by the STAs 2 and a state of reception of the second CTS frames by the AP 1 according to the present embodiment. In FIG. 7, it is assumed that each of the 1 ch to 4 ch with 20 MHz is divided into sub-channels with 5 MHz and each of the sub-channels is allocated to the STA 2-1, the STA 2-2, the STA 2-3, and the STA 2-4 in ascending order of frequency in the communication system according to the present embodiment. As illustrated in FIG. 7, since the second CTS frames transmitted by the STAs 2 are transmitted by using frequencies orthogonal between the STAs 2, even when the STAs 2 transmit the second CTS frames simultaneously, the AP 1 is able to recognize whether or not each of the STAs 2 transmits the second CTS frame by grasping the sub-channel in which the second CTS frame is observed. Thus, in a channel to which the sub-channel on which the second CTS frame is received belongs, the AP 1 is able to recognize that the STA 2 transmitting the second CTS frame has transmitted the first CTS frame.

The second CTS frame does not need to be recognized by the STAs 3 serving as legacy terminal apparatuses, and hence does not need to always keep compatibility with an existing IEEE802.11 standard, and it is considered that, for example, the CTS frame is transmitted in a mode of a bandwidth of a sub-channel. Since the second CTS frame is only required to allow determination about whether or not the AP 1 has received the second CTS frame, the STA 2 is only required to transmit a simple dummy signal or some kind of reference signal. Differently from the first CTS frame, the second CTS frame does not need to be always common between the STAs 2.

The STA 2 is also able to include, in the second CTS frame, information indicating a channel on which the STA 2 has transmitted the first CTS frame. For example, the STA 2 is able to have a new field in the second CTS frame so as to describe, in the field, information indicating a channel on which the STA 2 has transmitted the first CTS frame. In this case, the STA 2 does not need to transmit the second CTS frame from all the channels on which the STA 2 has transmitted the first CTS frame. At this time, the AP 1 is able to signal, to each of the STAs 2 in advance, priority order of channels on which the second CTS frame is transmitted or broadcast common priority order to each of the STAs 2.

Note that, even when the communication system does not set a sub-channel, the STA 2 is able to transmit the second CTS frame. In this case, it is premised that the STAs 2 transmit the second CTS frames in which at least parts of signal frames are common. First, the AP 1 is able to notify each of the STAs 2-1 to 2-4 in advance of respectively specific cyclic shift amounts in advance. A cyclic shift amount is desired to be, for example, an integral multiple of a cyclic prefix (CP) length inserted in an OFDM signal, but is not limited to a certain value.

The AP 1 and the STAs 2 are able to decide in advance a signal sequence used for the second CTS frame with each other. Each of the STAs 2-1 to 2-4 gives a cyclic shift by a specific cyclic shift amount allocated in advance to the second CTS frame and then transmits the second CTS frame on a channel on which the first CTS frame has been transmitted. The AP 1 applies Discrete Fourier Transform (DFT) to a signal received by the channel on which the first CTS frame has been received. The AP 1 applies inverse modulation on the basis of the signal sequence used for the second CTS frame and then applies inverse DFT (IDFT) processing. An output of the IDFT is a channel impulse response (CIR) between the AP 1 and the STA 2, and the CIR of the STA is output in a state of being shifted by the cyclic shift amount that is given by the STA 2 in advance to the specific signal. Thus, the AP 1 is able to recognize which STA 2 has transmitted the first CTS frame on the channel on the basis of the shift amount of the CIR and the cyclic shift amount which is decided in advance.

In accordance with the method as described above, the AP 1 is able to recognize on which channel each of the STAs 2 has received the first CTS frame on the basis of a signal received after receiving the first CTS frame. The AP 1 is able to recognize from which STA 2 the second CTS frame has been transmitted, and hence is able to estimate channel state information (CSI) between the AP 1 and the STA 2 on the basis of the second CTS frame. Accordingly, the AP 1 is able to decide a radio resource allocated to each of the STAs 2 between the AP 1 and the STA 2 on the basis of information indicating which channel is usable and the CSI between the AP 1 and the STA 2 (step S206). Specifically, the AP 1 is able to allocate a channel, on which a certain STA 2 has transmitted the first CTS frame, to the STA 2. A channel on which a plurality of STAs 2 has transmitted the first CTS frames is able to be allocated to the STA 2 having the best communication quality among the plurality of STAs 2. In addition, the AP 1 is able to allocate a channel to each of the STAs 2 in accordance with, for example, a data traffic amount to each of the STAs 2 and the AP 1 is also able to allocate a plurality of channels to one STA 2. Note that, the STA 2 is also able to describe, in the second CTS frame, information associated with the CSI between the AP 1 and the STA 2.

After deciding allocation of the radio resource to each of the STAs 2, the AP 1 generates an OFDMA signal including a data signal to each of the STAs 2 and transmits the OFDMA signal to each of the STAs 2 simultaneously (step S207).

The STA 2 demodulates a desired signal by the OFDMA signal transmitted by the AP 1 (step S208), and when the demodulation is able to be performed without error, a response signal (ACK frame) indicating that the demodulation is able to be performed without error to the AP 1 (step S209). Note that, as to a method of transmitting the ACK frame by the STA 2, any method is included in the present embodiment as long as following a method decided in advance between the AP 1 and the STA 2.

Note that, in duration fields included in the first RTS frame and the first CTS frame, the AP 1 or the STA 2 is able to describe a time period required for the AP 1 and the STA 2 until the reception of the ACK frame described above is completed from a time point of transmission (or a time point of reception completion) of the first RTS frame and the first CTS frame.

The AP 1 according to the present embodiment may determine, without receiving the second CTS frame, to which channel each of the STAs 2 has transmitted the first CTS frame. For example, the AP 1 is able to grasp channel state information between the AP 1 and each of the STAs 2 in advance by means of, for example, data transmission with each of the STAs 2, which is performed before the OFDMA transmission. Of course, the AP 1 needs to perform channel estimation to demodulate the first CTS frames received in a combined state as illustrated in FIG. 6. Of course, a channel estimation value estimated through the channel estimation by the AP 1 is obtained with a channel between the STA 2 that has transmitted the first CTS and the AP 1 combined. Thus, by comparing channel state information between the AP 1 and each of the STAs 2, which is grasped in advance, to the channel estimation value, the AP 1 is able to individually recognize the STA 2 that has transmitted the first CTS frame.

Figure 8:
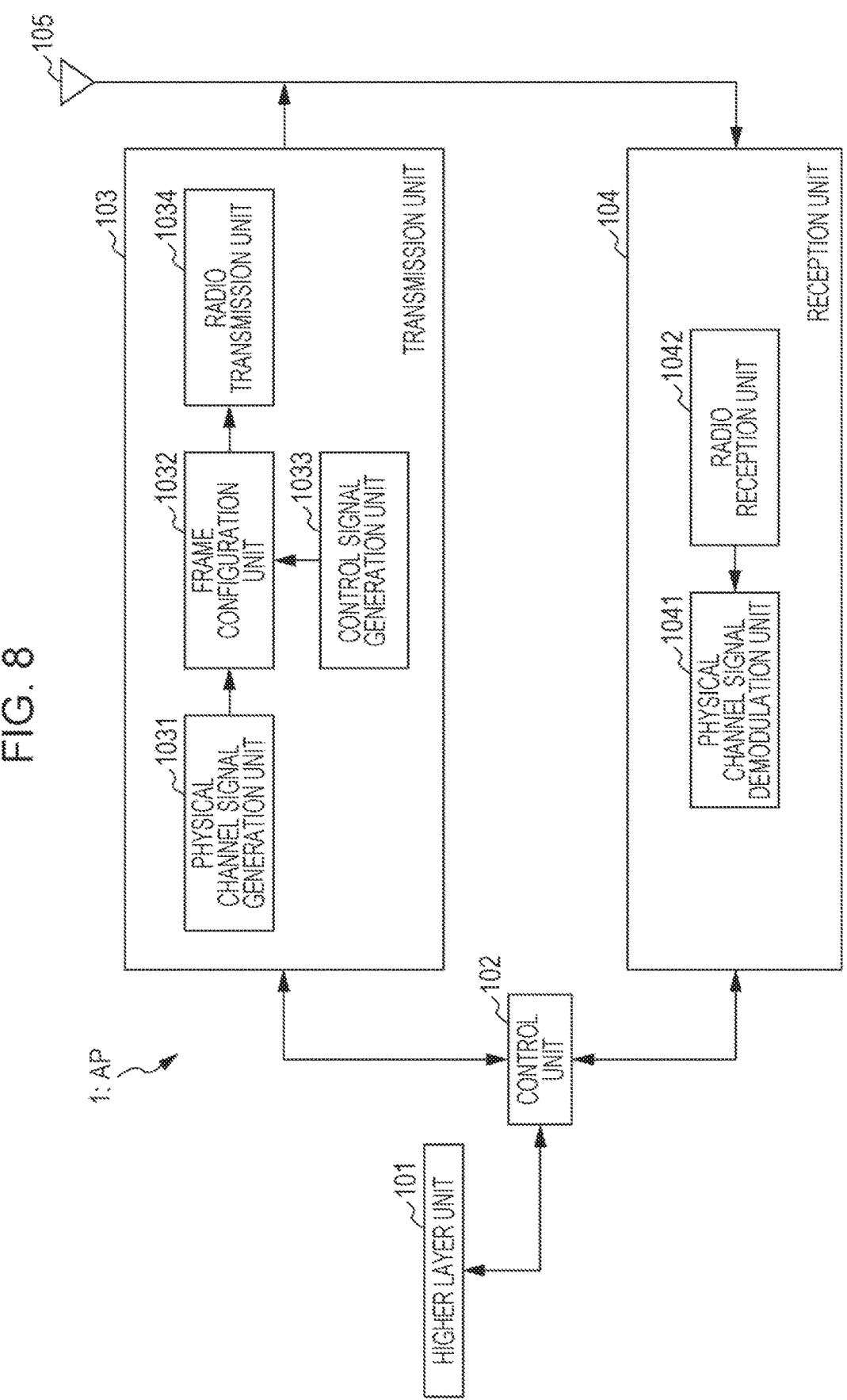
FIG. 8 is a schematic block diagram illustrating a configuration example of a radio transmission apparatus according to the invention.

FIG. 8 is a block diagram illustrating an example of a configuration of the AP 1 according to the first embodiment of the invention. As illustrated in FIG. 3, the AP 1 includes a higher layer unit 101, a control unit 102, a transmission unit 103, a reception unit 104, and an antenna 105.

The higher layer unit 101 performs processing of a medium access control (MAC) layer and the like. The higher layer unit 101 generates information for performing control of the transmission unit 103 and the reception unit 104 and outputs the information to the control unit 102. The control unit 102 controls the higher layer unit 101, the transmission unit 103, and the reception unit 104.

The transmission unit 103 further includes a physical channel signal generation unit 1031, a frame configuration unit 1032, a control signal generation unit 1033, and a radio transmission unit 1034. The physical channel signal generation unit 1031 generates baseband signals to be transmitted by the AP 1 to the STAs. Each of the signals generated by the physical channel signal generation unit 1031 includes a TF (training field) used by each of the STAs for channel estimation and data transmitted by an MSDU (MAC service data unit). Note that, an example in which the baseband signals to be transmitted to the STAs 2-1 to 2-4 and the STAs 3-1 to 3-4 are generated is indicated because the number of the STAs is eight in FIG. 1, but the present embodiment is not limited thereto.

The frame configuration unit 1032 multiplexes a signal generated by the physical channel signal generation unit 1031 and a signal generated by the control signal generation unit 1033, and configures a transmission frame of the baseband signal actually transmitted by the AP 1.

Figure 9:
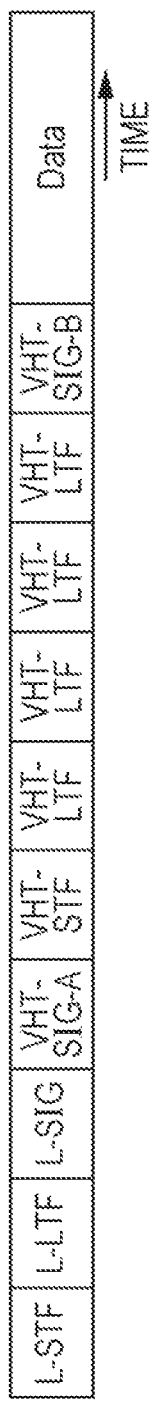
FIG. 9 illustrates a configuration example of a frame configuration of a signal of the invention.

FIG. 9 is a schematic view illustrating an example of a physical layer of the transmission frame generated by the frame configuration unit 1032 according to the present embodiment. The transmission frame includes reference signals such as an L-STF, an L-LTF, a VHT-STF, and a VHT-LTF. The transmission frame also includes control information such as an L-SIG, a VHT-SIG-A, and a VHT-SIG-B. The transmission frame further includes a data portion. The configuration of the transmission frame generated by the frame configuration unit 1032 is not limited to FIG. 9 and may include other control information (for example, an HT-SIG), reference signals (for example, an HT-LTF), and the like. The transmission frame generated by the frame configuration unit 1032 does not need to include all the signals such as the L-STF and the VHT-SIG-A. Note that, since information included in the L-SIG or the L-STF is information required for the AP 1 or each of the STAs 2 to demodulate the data portion, a frame excluding the data portion will be described below also as a physical layer header (PHY header).

The transmission frame generated by the frame configuration unit 1032 is classified into some frame types. For example, the frame configuration unit 1032 is able to generate three frame types of transmission frames of a management frame in which, for example, a connection state between apparatuses is managed, a control frame in which a communication state between apparatuses is managed, and a data frame including actual transmission data. The frame configuration unit 1032 is able to include information indicating a frame type to which the transmission frame to be generated belongs in a medium access control layer header (MAC header) transmitted in the data portion.

The radio transmission unit 1034 performs processing of converting the baseband signals generated by the frame configuration unit 1032 into radio frequency (RF) band signals. The processing performed by the radio transmission unit 1034 includes digital/analog conversion, filtering, frequency conversion from the baseband to the RF band, and the like.

The antenna 105 transmits signals generated by the transmission unit 103 to the STAs.

The AP 1 also has a function of receiving signals transmitted from the STAs. The antenna 105 receives the signals transmitted from the STAs and outputs the signals to the reception unit 104.

The reception unit 104 includes a physical channel signal demodulation unit 1041 and a radio reception unit 1042. The radio reception unit 1042 converts RF band signals input from the antenna 105 to baseband signals. The processing performed by the radio reception unit 1042 includes frequency conversion from the RF band to the baseband, filtering, analog/digital conversion, and the like. The processing performed by the reception unit 104 may include a function (carrier sense) of measuring peripheral interference in a specific frequency band to secure the frequency band.

The physical channel signal demodulation unit 1041 demodulates the baseband signals output by the radio reception unit 1042. The signals demodulated by the physical channel signal demodulation unit 1041 are signals transmitted in uplink by the STAs 2 and the STAs 3, and have a frame configuration similar to that of the data frame generated by the frame configuration unit 1032. Thus, the physical channel signal demodulation unit 1041 is able to demodulate the uplink data by the data channel on the basis of control information transmitted by the control channel of the data frame. Further, the physical channel signal demodulation unit 1041 may include a carrier sense function. Note that, the reception unit 104 may input signal power in the frequency band to the higher layer unit 101 via the control unit 102 and the higher layer unit 101 may perform processing associated with carrier sense.

Figure 10:
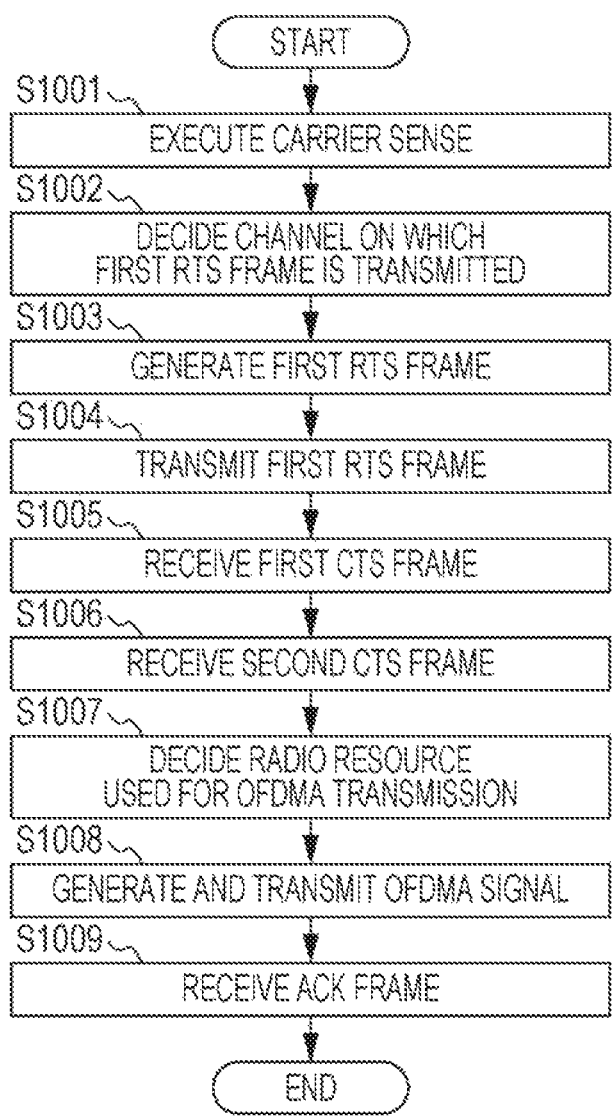
FIG. 10 is a flowchart illustrating an example of a communication method of a radio transmission apparatus according to the invention.

FIG. 10 is a flowchart illustrating a flow of signal processing of the AP 1 according to the present embodiment. An operation of the AP 1 will be described below with reference to FIGS. 8 and 10.

In the AP 1, when the higher layer unit 101 determines to perform OFDMA transmission for the STAs 2-1 to 2-4, the reception unit 104 firstly performs carrier sense for a channel that is able to be used for the OFDMA transmission (step S1001). The reception unit 104 notifies the higher layer unit 101 of information obtained through the carrier sense. For example, the reception unit 104 determines whether each channel is idle or busy and performs notification to the higher layer unit 101.

The higher layer unit 101 then decides, on the basis of the information notified from the reception unit 104, a channel on which the first RTS frame is transmitted and performs notification to the transmission unit 103 (step S1002).

Next, the transmission unit 103 generates a first RTS frame in accordance with the notification from the higher layer unit 101 (step S1003). For example, the physical channel signal generation unit 101 generates a baseband signal of the first RTS frame. Then, the control signal generation unit 1033 generates a control signal required for the STAs 2 and the STAs 3 to demodulate the first RTS frame. The frame configuration unit 1032 generates a signal frame, for example, as illustrated in FIG. 9 on the basis of the signals generated by the physical channel signal generation unit 1031 and the control signal generation unit 1033.

Next, the transmission unit 103 transmits, via the antenna 105, the first RTS frame that is generated (step S1004).

A resource reserving signal transmitted by the AP 1 may be a signal indicating a contention free period (CFP). Normally, the CFP is broadcasted into the BSS 1a by the AP 1 with a beacon signal or the like. In the present embodiment, however, the resource reserving signal makes it possible to notify start of the CFP to the STAs 3 and also notify that OFDMA transmission is started in the CFP to the STAs 2.

Next, after the transmission unit 104 has transmitted the first RTS frame and further a fixed waiting period has lapsed, the reception unit 104 starts a reception operation of the first CTS frame transmitted from each of the STAs 2 (step S1005). The fixed waiting period refers to, for example, waiting for the SIFS after transmission of the first RTS frame is completed. The reception unit 104 may start the reception operation for at least one channel of the channels on which the transmission unit 104 has transmitted the first RTS frame.

Next, the reception unit 104 starts a reception operation of a second CTS frame for at least one of channels on which the first CTS frame has been received (step S1006). The reception unit 104 then notifies the higher layer unit 101 of information about the first CTS frame and the second CTS frame. Note that, as described above, the AP 1 may not receive the second CTS frame.

Subsequently, on the basis of the information notified from the reception unit 104, the higher layer unit 101 decides the STAs 2 that participate in the OFDMA transmission and a radio resource allocated to each of the STAs 2, and performs notification to the transmission unit 103 (step S1007).

Next, the transmission unit 103 generates an OFDMA signal on the basis of the information notified from the higher layer unit 101 and transmits the OFDMA signal via the antenna 105 (step S1008).

Note that, the reception unit 104 also has a function of receiving an ACK frame transmitted by each of the STAs 2 participating in the OFDMA transmission after the transmission unit 103 transmits the OFDMA signal. In a similar manner to multi-user multiple-input multiple-output (MU-MIMO) transmission of IEEE802.11ac, the STA 2 according to the present embodiment is able to transmit the ACK frame on the basis of an ACK frame request signal transmitted by the AP 1. The STAs 2 are able to simultaneously transmit ACK frames on a channel allocated at the time of the OFDMA transmission, that is, transmit ACK frames by the OFDMA transmission of uplink. In this case, after waiting for the SIFS after the reception of the OFDMA signal is completed, each of the STAs 2 transmits the ACK frame. By receiving the ACK frame transmitted from the STA 2 with the method as described above, the reception unit 104 is able to determine whether or not data transmission is able to be performed correctly for the STA 2.

Note that, the AP 1 according to the present embodiment starts a reception operation after transmitting the first RTS frame. In a case where the AP 1 has not received the first CTS frame from the STAs 2 for a fixed time period after the AP 1 has started the reception operation, the AP 1 may end the operation.

In a case where amounts of data addressed to the STAs that are caused to participate in the OFDMA transmission by the AP 1 are different from each other, OFDMA signals to a part of the STAs 2 may end before OFDMA signals to the other STAs 2. In this case, the AP 1 may transmit a frame signaling that the NAV set by the first RTS frame and the first CTS frame may be cleared to release the channel, on which the OFDMA signal transmission ends earlier, to other STAs 2 and STAs 3 in the BSS 1a.

Figure 11:
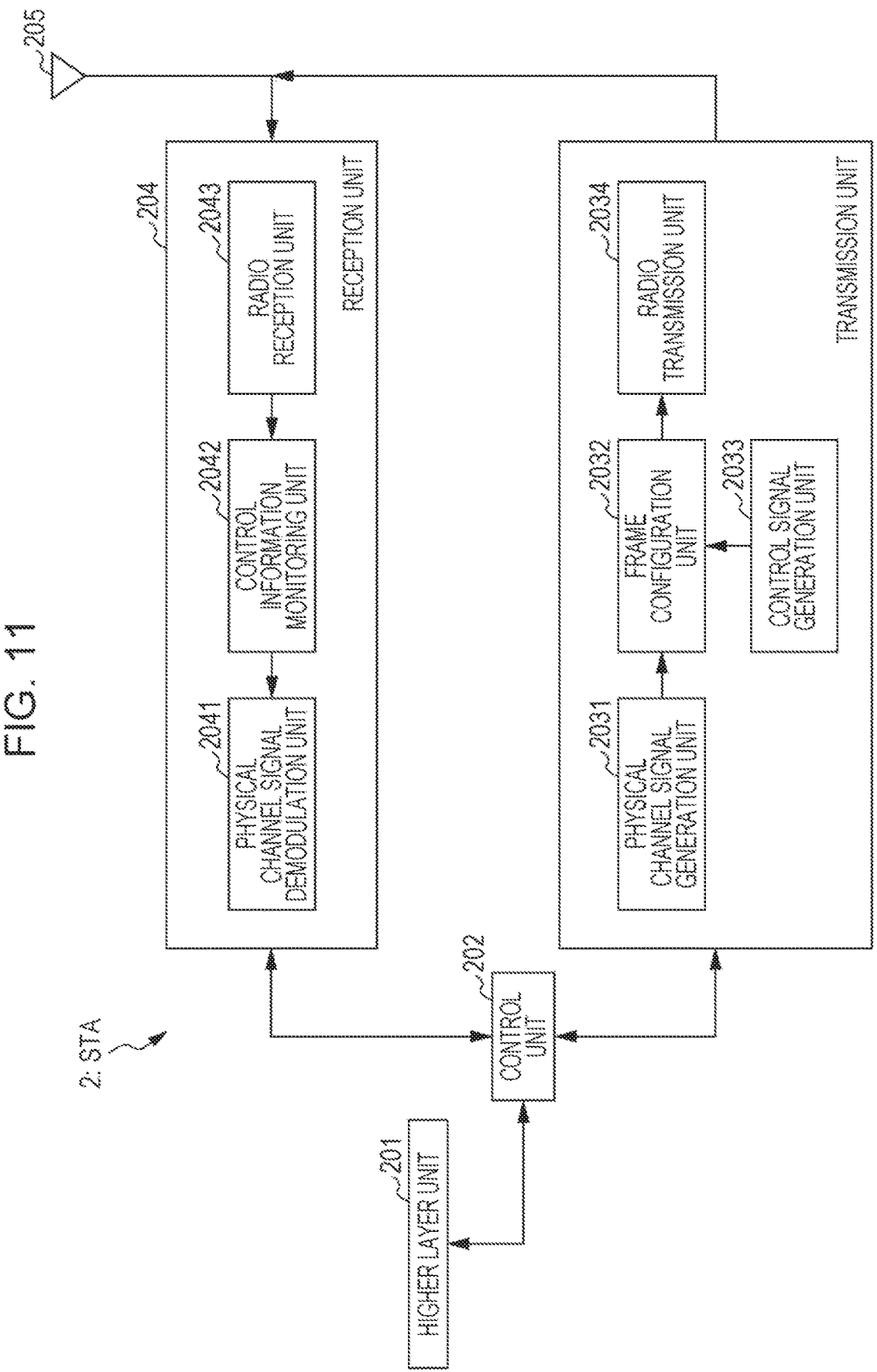
FIG. 11 is a schematic block diagram illustrating a configuration example of a radio receiving apparatus according to the invention.

FIG. 11 is a block diagram illustrating a configuration example of the STA 2 according to the present embodiment. As illustrated in FIG. 11, the STA 2 includes a higher layer unit 201, a control unit 202, a transmission unit 203, a reception unit 204, and an antenna 205.

The higher layer unit 201 performs processing of a MAC layer and the like. The higher layer unit 201 generates information for performing control of the transmission unit 203 and the reception unit 204 and outputs the information to the control unit 202.

The antenna 205 receives a signal transmitted by the AP 1 and outputs the signal to the reception unit 204.

The reception unit 204 includes a physical channel signal demodulation unit 2041, a control information monitoring unit 2042, and a radio reception unit 2043. The radio reception unit 2043 converts an RF band signal input from the antenna 205 into a baseband signal. The processing performed by the radio reception unit 2043 includes frequency conversion from the RF band to the baseband, filtering, analog/digital conversion, and the like.

The control information monitoring unit 2042 reads information described in a PHY header (for example, an L-SIG or a VHT-SIG-A) of a transmission frame transmitted by the AP 1 from the baseband signal output by the radio reception unit 2043 and inputs the information to the physical channel signal demodulation unit 2041.

On the basis of the control information acquired by the control information monitoring unit 2042, the physical channel signal demodulation unit 2041 demodulates the transmission frame transmitted by the AP 1, and inputs a demodulation result to the higher layer unit 201 via the control unit 202.

The higher layer unit 201 interprets data, which is demodulated by the physical channel signal demodulation unit 2041, in a MAC layer, an LLC (Logical Link Control) layer, and a transport layer. As processing in the MAC layer of the higher layer unit 201, various information is able to be acquired from the transmission frame transmitted by the AP 1. For example, when the higher layer unit 201 interprets that the transmission frame transmitted by the AP 1 is a beacon frame, it is possible to acquire, for example, information indicating a function (capability) of the AP 1 described in the beacon frame.

The processing performed by the reception unit 204 may include a function (carrier sense) of measuring peripheral interference in a specific frequency band to secure the frequency band.

The STA 2 also has a function of transmitting a signal. The antenna 205 transmits an RF band signal generated by the transmission unit 203 to the AP 1.

The transmission unit 203 includes a physical channel signal generation unit 2031, a control signal generation unit 2033, a frame configuration unit 2032, and a radio transmission unit 2034. The physical channel signal generation unit 2031 generates a baseband signal to be transmitted by the STA 2 to the AP 1. The control signal generation unit 2033 generates a control signal used for the AP 1 to demodulate the signal generated by the physical channel signal generation unit 2031. The frame configuration unit 2032 generates a signal frame, for example, as illustrated in FIG. 9 on the basis of the signals generated by the physical channel signal generation unit 2031 and the control signal generation unit 2032.

The radio transmission unit 2034 converts the baseband signal generated by the frame configuration unit 2032 into an RF band signal. The processing performed by the radio transmission unit 2034 includes digital/analog conversion, filtering, frequency conversion from the baseband to the RF band, and the like.

Figure 12:
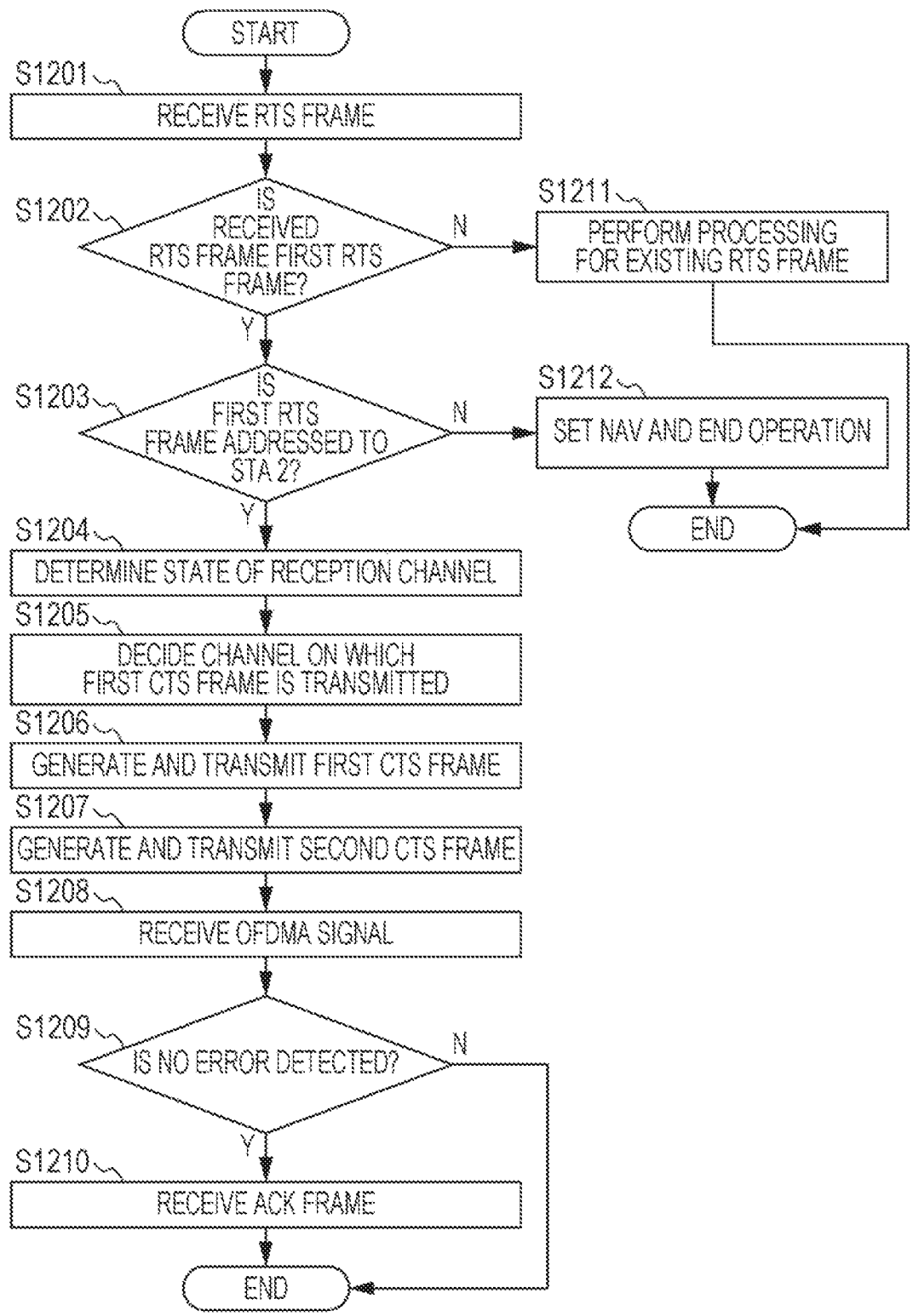
FIG. 12 is a flowchart illustrating an example of a communication method of the radio receiving apparatus according to the invention.

FIG. 12 is a flowchart for explaining signal processing of the STA 2 according to the present embodiment. An operation of the STA 2 will be described below with reference to FIGS. 11 and 12.

First, when having received an RTS frame transmitted by the AP 1, the reception unit 204 notifies the higher layer unit 201 of a demodulation result thereof (step S1201). The higher layer unit 201 determines whether the RTS frame is a first RTS frame or an existing RTS frame (step S1102).

When the RTS frame is not the first RTS frame (step S1202/N), the STA 2 performs an operation similar to that of the existing IEEE802.11 standard (step S1211, description thereof will be omitted). On the other hand, when the RTS frame is the first RTS frame (step S1202/Y), the higher layer unit 201 is able to recognize that the AP 1 connected to the STA 2 is to perform OFDMA transmission that may include the STA 2.

Next, the higher layer unit 201 determines whether or not the first RTS frame is a first RTS frame addressed to the STA 2 (step S1203). When the RTS frame is not the RTS frame addressed to the STA 2 (step S1203/N), the higher layer unit 201 sets the NAV and stops a transmission operation of the transmission unit 203 and a reception operation of the reception unit 204 (step S1212). On the other hand, when the RTS frame is the RTS frame addressed to the STA 2 (step S1203/Y), the STA 2 shifts to a transmission operation of a first CTS frame described below.

Subsequently, the higher layer unit 201 instructs the reception unit 204 to determine a state (idle or busy) of a channel on which the first RTS frame has been received and the reception unit 204 determines the state of the channel (step S1204). The higher layer unit 201 may control the reception unit 204 so as to determine states of all the channels on which the first RTS frame has been received or to determine a state of only a part of the channels.

Next, on the basis of information notified from the reception unit 204, the higher layer unit 201 decides a channel on which the first CTS frame is transmitted (step S1205). Note that, the higher layer unit 201 is able to determine that the channels a state report of which is not notified from the reception unit 204 are all busy. The higher layer unit 201 notifies the transmission unit 203 of the channel on which the first CTS frame is transmitted. The higher layer unit 201 may control the transmission unit 203 to transmit the first CTS frame to all the channels that are able to be determined to be idle with information from the reception unit 204 or may control the transmission unit 203 to transmit the first CTS frame to a part of the channels.

Subsequently, the transmission unit 203 generates the first CTS frame in accordance with an instruction from the higher layer unit 201 and transmits the first CTS frame to the AP 1 (step S1206). For example, the physical channel signal generation unit 2031 generates a baseband signal of the first CTS frame. The control signal generation unit 2033 generates a control signal by which the AP 1 is able to demodulate the first CTS frame. Then, the frame configuration unit 2032 generates the first CTS frame and the radio transmission unit 2034 outputs the first CTS frame to the antenna 105.

Further, after transmitting the first CTS frame, the transmission unit 203 transmits a second CTS frame to the channel on which the first CTS frame has been transmitted (step S1207). As has been described above, the STA 2 does not need to always transmit the second CTS frame. The STA 2 does not need to always transmit the second CTS frame to all the channels on which the first CTS frame has been transmitted.

Note that, the transmission unit 203 is able to wait for a fixed time period after transmitting the first CTS frame (for example, the transmission unit 203 waits for the SIFS after transmitting the first CTS frame) and then transmit the second CTS frame. The frame configuration unit 2032 of the transmission unit 203 may apply the second CTS frame after the first CTS frame and configure a signal frame (hereinafter, referred to as a third CTS frame) as one signal frame. In this case, in order for the STAs 3 serving as legacy terminals to recognize the third CTS frame correctly as a CTS frame, the control signal generation unit 2033 is able to describe, in a duration field of a PHY header applied to the third CTS frame, a time period obtained by subtracting a frame length of the second CTS frame from a frame length of the third CTS frame.

After the transmission unit 203 transmits the first CTS frame and a first instruction frame, the reception unit 204 receives an OFDMA signal transmitted from the AP 1 (step S1208). The AP 1 is able to include radio resource allocation information for each of the STAs 2 in the OFDMA signal. The allocation information is considered to be included in information (for example, information of a PHY header) of a PHY layer of the OFDMA signal or included in information (for example, a MAC header header) of a MAC layer, and the signal in which the allocation information is included may be decided in advance between the AP 1 and the STA 2.

On the basis of the allocation information, the reception unit 204 demodulates the signal transmitted from the AP 1, and notifies the higher layer unit 201 of information thereof. The higher layer unit 201 determines whether or not the signal to the STA 2 is decoded correctly (step S1209). When determining that the signal to the STA 2 is decoded without error (step S1209/Y), the higher layer unit 201 instructs the transmission unit 203 to transmit an ACK frame to the AP 1 and the transmission unit 203 transmits the ACK frame to the AP 1 in accordance with the instruction of the higher layer unit 201 (step S1210). In this manner, the operation of the STA 2 ends. Any method of transmitting the ACK frame by the transmission unit 203 is included in the present embodiment as long as being a method (for example, the aforementioned method) decided in advance between the AP 2 and the STA 2. Note that, when the higher layer unit 201 recognizes an error in a decoding result of a signal to the STA 2 (step S1209/N), the operation of the STA 2 ends at that point.

When the STA 2 has not received a signal transmitted from the AP 1 for a fixed time period after having transmitted the first CTS frame or the second CTS frame to the AP 1, the STA 2 may determine that the AP 1 has not performed OFDMA transmission and stop a reception operation or newly start another communication operation. The STA 2 may transmit, to the channel on which the first CTS frame has been transmitted, a signal frame describing that the NAV set in the first CTS frame is able to be solved.

According to the communication system including the AP 1 and the STAs 2 described above, in a communication system in which CSMA/CA is premised and a legacy terminal (the STA 3 according to an example of the present embodiment) of an existing IEEE802.11 standard exists, a radio channel is able to be efficiently reserved while realizing coexistence with the legacy terminal, and OFDMA transmission is able to be realized while reducing overhead, thus making it possible to significantly contribute to improvement of frequency efficiency of the communication system.

2. Common in all Embodiment

A program which runs in the AP 1, the STAs 2, and the STAs 3 according to the invention is a program that controls a CPU and the like (program that causes a computer to function) such that the functions in the aforementioned embodiment concerning the invention are realized. The pieces of information handled by the apparatuses are temporarily accumulated in a RAM during the processing thereof, and then stored in various ROMs and HDDs and read, corrected, and written by the CPU when necessary. A recording medium that stores the program therein may be any of a semiconductor medium (for example, a ROM, a nonvolatile memory card or the like), an optical recording medium (for example, a DVD, an MO, an MD, a CD, a BD or the like), a magnetic recording medium (for example, a magnetic tape, a flexible disc or the like), and the like. Moreover, there is also a case where, by executing the loaded program, not only the functions of the aforementioned embodiment are realized, but also by performing processing in cooperation with an operating system, other application programs or the like on the basis of an instruction of the program, the functions of the invention may be realized.

When being distributed in the market, the program is able to be stored in a portable recording medium and distributed or be transferred to a server computer connected through a network such as the Internet. In this case, a storage apparatus of the server computer is also included in the invention. A part or all of the AP 1, the STAs 2, and the STAs 3 in the aforementioned embodiment may be realized as an LSI which is a typical integrated circuit. Each functional block of the AP 1, the STAs 2, and the STAs 3 may be individually formed into a chip, or a part or all thereof may be integrated and formed into a chip. When each functional block is made into an integrated circuit, an integrated circuit control unit for controlling them is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Note that, the invention of the present application is not limited to the aforementioned embodiment. The AP 1, the STAs 2, and the STAs 3 of the invention of the present application are not limited to be applied to a mobile station apparatus, but, needless to say, are applicable to stationary or unmovable electronic equipment which is installed indoors or outdoors such as, for example, AV equipment, kitchen equipment, cleaning/washing machine, air conditioning equipment, office equipment, automatic vending machine, other domestic equipment, and the like.

As above, the embodiment of the invention has been described in detail with reference to drawings, but specific configurations are not limited to the embodiment, and a design and the like which are not departed from the main subject of the invention are also included in the scope of claims.

INDUSTRIAL APPLICABILITY

The invention is suitably used for a radio transmission apparatus, a radio receiving apparatus, a communication system, and a communication method.

Note that, the present international application claims priority from Japanese Patent Application No. 2015-018911 filed on Feb. 3, 2015, and the entire contents of Japanese Patent Application No. 2015-018911 are hereby incorporated herein by reference.

REFERENCE SIGNS LIST

1 AP
2, 2-1, 2-2, 2-3, 2-4, 3, 3-1, 3-2, 3-3, 3-4 STA
101, 201 higher layer unit
102, 202 control unit
103, 203 transmission unit
104, 204 reception unit
105, 205 antenna
1031, 2031 physical channel signal generation unit
1032, 2032 frame configuration unit
1033, 2033 control signal generation unit
1034, 2034 radio transmission unit
1041, 2041 physical channel signal demodulation unit
1042, 2043 radio reception unit
2042 control information monitoring unit

The invention claimed is:

1. A first radio receiving apparatus included in a plurality of radio receiving apparatuses that perform communication with a radio transmission apparatus using OFDMA transmission, comprising:
   a reception unit that receives a resource reserving signal using at least one radio resource from which the radio transmission apparatus transmits the resource reserving signal, and
   a transmission unit that transmits a resource reserving response signal to the radio transmission apparatus by using at least one radio resource with which the resource reserving signal is received, wherein
   the resource reserving signal includes a receiver address (RA) field in which a broadcast address is described;
   the resource reserving signal further includes information indicating a combination of the plurality of radio receiving apparatuses in PHY header;
   the combination of the plurality of radio receiving apparatuses explicitly indicates destination receiving apparatuses of the resource reserving signal;
   the radio resource with which the resource reserving signal is received is divided into a plurality of sub-channels, and information indicating a sub-channel with which the resource reserving response signal is transmitted among the plurality of sub-channels is signaled from the radio transmission apparatus;
   the resource reserving signal includes information indicating a bandwidth of the radio resource with which the radio transmission apparatus transmits the resource reserving signal;
   a bandwidth of the sub-channel is a bandwidth obtained by equally dividing the bandwidth of the radio resource with which the resource reserving signal is transmitted;
   a sub-channel with which the resource reserving response signal is transmitted among the plurality of sub-channels is allocated by the radio transmission apparatus; and
   the sub-channel to which the resource reserving response signal is transmitted is set for each of the radio receiving apparatuses indicated by the combination of the plurality of radio receiving apparatuses included in the resource reserving signal.

2. The first radio receiving apparatus according to claim 1, wherein the reception unit receives, from the radio transmission apparatus, an OFDMA signal including a data signal to the first radio receiving apparatus after the transmission unit transmits the resource reserving response signal.

3. The first radio receiving apparatus according to claim 1, wherein a time period during which the transmission unit waits until the resource reserving response signal is transmitted after receiving the resource reserving signal is equal to a time period during which the another of the radio receiving apparatuses waits until the resource reserving response signal is transmitted after receiving the resource reserving signal.

4. The radio receiving apparatus according to claim 1, wherein the transmission unit transmits the resource reserving response signal at the same time as a time at which at least one of the plurality of radio receiving apparatuses transmits the resource reserving response signal.

5. A radio transmission apparatus that performs communication with a plurality of radio receiving apparatuses using OFDMA transmission, comprising:
   a transmission unit that transmits a resource reserving signal, and
   a reception unit that receives a resource reserving response signal transmitted by at least one radio receiving apparatus among the plurality of radio receiving apparatuses by using at least one radio resource with which the resource reserving signal is received, wherein
   the resource reserving includes a receiver address (RA) field in which a broadcast address is described;
   the resource reserving signal further includes information indicating a combination of the plurality of radio receiving apparatuses in PHY header;
   the combination of the plurality of radio receiving apparatuses explicitly indicates destination receiving apparatuses of the resource reserving signal;
   the radio resource with which the resource reserving signal is transmitted by the transmission unit is divided into a plurality of sub-channels, and information indicating a sub-channel with which the resource reserving response signal is transmitted by the radio receiving apparatus among the plurality of sub-channels is signaled to the radio receiving apparatus;
   the resource reserving signal includes information indicating a bandwidth of the radio resource with which the transmission unit transmits the resource reserving signal;
   a bandwidth of the sub-channel is a bandwidth obtained by equally dividing the bandwidth of the radio resource with which the resource reserving signal is transmitted;

a sub-channel with which the resource reserving response signal is transmitted among the plurality of sub-channels is allocated by the radio transmission apparatus; and the sub-channel to which the resource reserving response signal is transmitted is set for each of the radio receiving apparatuses indicated by the combination of the plurality of radio receiving apparatuses included in the resource reserving signal.

6. The radio transmission apparatus according to claim 5, wherein the reception unit continues a reception operation for a predetermined time period after transmitting the resource reserving signal, and the reception unit stops the reception operation in a case where no resource reserving response signal transmitted by the plurality of radio receiving apparatuses is received for the predetermined time period.

7. The radio transmission apparatus according to claim 5, wherein the transmission unit transmits an OFDMA signal including a data signal to the plurality of radio receiving apparatuses after the reception unit receives the resource reserving response signal.

8. A communication method for a first radio receiving apparatus included in a plurality of radio receiving apparatuses that perform communication with a radio transmission apparatus using OFDMA transmission, the communication method comprising the steps of:

receiving a resource reserving signal using at least one radio resource from which the radio transmission apparatus has transmitted the resource reserving signal, and transmitting a first resource reserving response signal to the radio transmission apparatus by using at least one radio resource with which the resource reserving signal is received, wherein the resource reserving signal includes a receiver address (RA) field in which a broadcast address is described;

the resource reserving signal further includes information indicating a combination of the plurality of radio receiving apparatuses in PHY header;

the combination of the plurality of radio receiving apparatuses explicitly indicates destination receiving apparatuses of the resource reserving signal;

the radio resource with which the resource reserving signal is received is divided into a plurality of sub-channels, and information indicating a sub-channel with which the first resource reserving response signal is transmitted among the plurality of sub-channels is signaled from the radio transmission apparatus;

the resource reserving signal includes information indicating a bandwidth of the radio resource with which the radio transmission apparatus transmits the resource reserving signal;

a bandwidth of the sub-channel is a bandwidth obtained by equally dividing the bandwidth of the radio resource with which the resource reserving signal is transmitted;

a sub-channel with which the resource reserving response signal is transmitted among the plurality of sub-channels is allocated by the radio transmission apparatus; and the sub-channel to which the resource reserving response signal is transmitted is set for each of the radio receiving apparatuses indicated by the combination of the plurality of radio receiving apparatuses included in the resource reserving signal.

\* \* \* \* \*